US007233684B2

(12) United States Patent
Fedorovskaya et al.

(10) Patent No.: US 7,233,684 B2
(45) Date of Patent: Jun. 19, 2007

(54) IMAGING METHOD AND SYSTEM USING AFFECTIVE INFORMATION

(75) Inventors: Elena A. Fedorovskaya, Pittsford, NY (US); Serguei Endrikhovski, Rochester, NY (US); Tomasz A. Matraszek, Pittsford, NY (US); Kenneth A. Parulski, Rochester, NY (US); Carolyn A. Zacks, Rochester, NY (US); Karen M. Taxier, Rochester, NY (US); Michael J. Telek, Pittsford, NY (US); Frank Marino, Rochester, NY (US); Dan Harel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 762 days.

(21) Appl. No.: 10/304,127

(22) Filed: Nov. 25, 2002

(65) Prior Publication Data

US 2004/0101212 A1  May 27, 2004

(51) Int. Cl.
*G06K 9/00* (2006.01)
*G06K 9/60* (2006.01)

(52) U.S. Cl. .................................................... 382/118

(58) Field of Classification Search ................ 382/118, 382/123, 284, 305; 348/231.2, 231.3, 207.2, 348/335, 373, 322, 323; 358/302, 487; 355/18; 396/2; 705/10; 709/201; 707/3, 707/7, 101, 102, 104.1
See application file for complete search history.

(56) References Cited

U.S. PATENT DOCUMENTS

| 5,164,831 | A |   | 11/1992 | Kuchta et al. |
| 5,477,264 | A |   | 12/1995 | Sarbadhikari et al. |
| 5,666,215 | A | * | 9/1997  | Fredlund et al. ............ 358/487 |
| 5,734,425 | A |   | 3/1998  | Takizawa et al. |
| 5,742,233 | A |   | 4/1998  | Hoffman et al. |
| 5,760,917 | A |   | 6/1998  | Sheridan |
| 5,911,687 | A |   | 6/1999  | Sato et al. |
| 6,003,991 | A |   | 12/1999 | Viirre |
| 6,004,061 | A |   | 12/1999 | Manico et al. |
| 6,163,361 | A | * | 12/2000 | McIntyre et al. ............ 355/18 |
| 6,282,231 | B1|   | 8/2001  | Norman et al. |
| 6,282,317 | B1|   | 8/2001  | Luo et al. |
| 6,287,252 | B1|   | 9/2001  | Lugo |
| 6,294,993 | B1|   | 9/2001  | Calaman |
| 6,438,323 | B1|   | 8/2002  | DeCecca et al. |

(Continued)

FOREIGN PATENT DOCUMENTS

EP         0 467 094        3/1998

(Continued)

OTHER PUBLICATIONS

"Looking at Pictures:Affective facial, visceral, and behavioral reactions", by Peter J. Lang et al., Psychophysiology, 30 (1993) 261-273.

(Continued)

*Primary Examiner*—Amir Alavi
(74) *Attorney, Agent, or Firm*—Ronald R. Schindler, II

(57) ABSTRACT

Imaging methods and systems are provided that use affective information. In one aspect an image of a scene is captured. Affective information is collected. The affective information is associated with the image.

22 Claims, 15 Drawing Sheets

U.S. PATENT DOCUMENTS

| | | | |
|---|---|---|---|
| 6,608,615 | B1 | 8/2003 | Martins |
| 6,629,104 | B1* | 9/2003 | Parulski et al. ............. 707/102 |
| 6,727,953 | B1* | 4/2004 | Patton et al. ............... 348/373 |
| 6,775,381 | B1* | 8/2004 | Nelson et al. ................ 380/54 |
| 2001/0043279 | A1* | 11/2001 | Niikawa et al. ............ 348/335 |
| 2002/0019584 | A1 | 2/2002 | Schulze et al. |
| 2002/0032689 | A1 | 3/2002 | Abbott, III et al. |
| 2002/0076100 | A1 | 6/2002 | Luo |
| 2002/0101619 | A1 | 8/2002 | Tsubaki et al. |
| 2003/0142041 | A1 | 7/2003 | Barlow et al. |
| 2003/0146978 | A1* | 8/2003 | Toyoda .................... 348/207.2 |
| 2003/0210255 | A1 | 11/2003 | Hiraki |

FOREIGN PATENT DOCUMENTS

| | | |
|---|---|---|
| EP | 1 109 132 | 6/2001 |
| EP | 1 220 530 | 7/2002 |
| WO | WO 01/26021 | 4/2001 |
| WO | WO 01/71636 | 9/2001 |
| WO | WO 02/27640 | 4/2002 |

OTHER PUBLICATIONS

"FotoFile: A Consumer Multimedia Organization and Retrieval System", by Allan Kuchinsky et al.

"Facial ExpressionRecognition using a Dynamic Model and Motion Energy", by Irfan Essa et al. MIT Media Laboratory Perceptual Computing Section Technical Report No. 307, pp. 1-8.

Digital Still Camera Image File Format Standard, Version 2.1, Jul. 1998, Japan Electronic Industry Development Association.

"Behind Blue Eyes" by Claire Tristram, Technology Review, May 2001.

CompactFlash Specification Revision 1.4, CompactFlash Association, Jul. 1999.

U.S. Appl. No. 09/549,356, entitled "Customizing A Digital Camera" by Prabu et al. filed Apr. 14, 2000.

Angela Chang et al., "LumiTouch: An Emotional Communication Device", lumitouch@media.mit.edu.

Olivier Liechti et al., "A Digital Photography Framework Enabling Affective Awareness in Home Communication".

Rebecca Hansson et al., "The LoveBomb: Encouraging the Communication of Emotions in Public Spaces", Interactive Institute, Sweden, www.playresearch.com.

Jennifer Healey et al., "StartleCam: A Cybernetic Wearable Camera", Oct. 1998, pp. 1-8, 2nd International Symposium on Wearable Computers 1998.

Don Lake, "How a Cybernetic Camera Triggered by the Subconscious Could Tackle Image Overload", Nov. 2000, pp. 21-23.

Jennifer Healey, "Wearable and Automotive Systems for Affect Recognition from Physiology", May 2000, pp. 1-3, Massachusetts Institute of Technology.

Applied Science Laboratories, "Technology and Systems for Eye Tracking: Model H6", www.a-s-l.com.

Hidehiko Hayashi et al., "Assessment of Extra High Quality Images Using Both EEG and Assessment Words on High Order Sensations", 2000 IEEE International Conference, vol. 2, Oct. 8, 2000, pp. 1289-1294, XP010524834.

Maja Pantic et al., "Automatic Analysis of Facial Expressions: The State of the Art", IEEE Transactions on Pattern Analysis and Machine Intelligence, vol. 22, No. 12, Dec. 2000, pp. 1424-1445, XP002276537.

Rosalind W. Picard et al., "Toward Machine Emotional Intelligence: Analysis of Affective Physiological State", IEEE Transactions on Pattern Analysis and Machine Intelligence, vol. 23, No. 10, Oct. 2001, pp. 1175-1191, XP002268746.

\* cited by examiner

IMAGING METHOD AND SYSTEM USING AFFECTIVE INFORMATION

CROSS REFERENCE TO RELATED APPLICATIONS

Reference is made to commonly assigned U.S. patent application Ser. No. 09/721,222, entitled "Method For Adding Personalized Metadata to a Collection of Digital Images" filed by Parulski et al. on Nov. 22, 2000; Ser. No. 10/036,113, entitled "Method For Creating and Using Affective Information in a Digital Imaging System" filed by Matraszek et al on Dec. 26, 2001; Ser. No. 10/036/123 entitled "Method for Using Affective Information Recorded With Digital Images for Producing an Album Page" filed by Matraszek et al., on Dec. 26, 2001; Ser. No. 10/303,978 entitled "Camera System With Eye Monitoring" filed by Miller et. al on Nov. 25, 2002; Ser. No. 10/304,037 entitled "Method And System For Creating And Using Affective Information In An Image Capture Device For Health Monitoring And Personal Security"; filed by Fedorovskaya et al. on Nov. 25, 2002; Ser. No. 10/303,520 entitled "Method and Computer Program Product For Determining an Area of Importance In An Image Using Eye Monitoring Information" filed by Miller et al. on Nov. 25, 2002; the disclosures of which are incorporated herein by reference.

FIELD OF THE INVENTION

The present invention relates to image capture systems and, more particularly, to image capture systems that also capture affective information.

BACKGROUND OF THE INVENTION

Increasingly, still and motion images are recorded in digital form. Digital still and motion images can be captured using a digital still or digital video cameras. Digital still and motion images are also obtained by converting images that have been recorded in other ways into digital form. For example it is well known to use analog to digital converters to convert analog electronic video signals into digital images. It is also known to use optical scanners to derive digital images from images recorded on photographic prints, films, plates and negatives.

Digital still and motion images are easily viewed, stored, retrieved, and printed by a user using a home computer or other image processing device. Such images can be uploaded to a website for viewing, as described in commonly assigned U.S. Pat. No. 5,666,215 filed by Fredlund et al. on Aug. 3, 1995. Using a web browser, uploaded digital images can be viewed, selected for printing, electronically transmitted to other family members and/or friends or stored in on-line databases and photo albums.

With the recent increase in the use of digital cameras for picture taking and with the recent growth in the use of technology that converts conventional still images, analog video images, and film based motion pictures into digital form, the volume of digital images that are available is rapidly increasing. However, users often do not immediately print or otherwise use the digital images, but instead opt to upload digital images to an electronic storage device or data storage medium for later use. Accordingly, personal computers, personal digital assistants, computer networks, optical, magnetic and electronic storage mediums, so-called set top television devices and other electronic image storage devices are increasingly being used to store digital still and motion images.

Therefore the task of classifying or cataloging digital still and motion images on such storage devices in a way that they will be easily accessible by the user is becoming increasingly important. Some users create large personal databases to organize the digital still and motion images on such storage devices. Many computer programs have been developed to help users to do this. However, because of the time and effort necessary to review and categorize images, these databases are typically only rarely used and updated.

Thus, what is needed is a way to help organize and categorize images with reduced emphasis on the post capture analysis and categorization of images.

Even when users make the investment of time and energy necessary to organize images into databases, the databases are typically organized according to various categories such as the date of capture, places, events, people. Other categories are also used. Often, such categories do not inherently help the user to locate images that are of particular importance or value. Instead the user must remember the image, and when the image was captured and/or how the user categorized it.

Thus, what is also needed is a more useful basis for organizing images. It is known from various studies and observations that the most memorable categories of events and subsequently pictures are the ones that are associated with user's feelings at the time of capture or the emotional reaction that the user experienced during the event or at the scene. Information that can be used to characterize the emotional state of a user is known as affective information. Affective information represents a user's psychological, physiological, and behavioral reactions to an event. Affective information can refer both to recorded raw physiological signals and their interpretations. Using affective information, digital still and video images can be classified based on a user's subjective importance, a degree of preference or the intensity of and nature of specific emotions. Such classifications can help to quickly find, review and share those valuable images.

Various methods are known in the art for deriving affective information based upon a user's reaction to an image. One example of a system that monitors physiological conditions to derive affective information is a wearable capture system that enables the classification of images as important or unimportant based on biosignals from human body. This system was described in an article entitled "Humanistic Intelligence: "WearComp" as a new framework and application for intelligent signal processing" published in the Proceedings of the Institute of Electrical and Electronics Engineers (IEEE), 86, pp. 2123–2151, 1998 by Mann. In his paper, Mann described an example of how the system could potentially operate in a situation when a wearer was attacked by a robber wielding a shotgun, and demanding cash. In this case, the system detects physiological signals such as a sudden increase of the wearer's heart rate with no corresponding increase in footstep rate. Then, the system makes an inference from the biosignals about high importance of the visual information. This, in turn, triggers recording of images from the wearer's camera and sending these images to friends or relatives who would determine a degree of a danger.

Another example of such a system is described in a paper entitled, "StartleCam: A Cybernetic Wearable Camera" published in: Proceedings of the Second International Symposium on Wearable Computers, 1998, by Healey et al. In the system proposed in this paper, a wearable video camera with a computer and a physiological sensor that monitors skin conductivity are used. The system is based on detecting a startle response—a fast change in the skin conductance. Such a change in the skin conductance is often associated with reactions of sudden arousal, fear or stress. When the startle response is detected, a buffer of digital images, recently captured by the wearer's digital camera, is saved and can be optionally transmitted wirelessly to the remote computer. This selective storage of digital images creates a "memory" archive for the wearer which aims to mimic the wearer's own selective memory response. In another mode, the camera can be set to automatically record images at a specified frequency, when very few responses have been detected from the wearer, indicating that their attention level has dropped.

The systems proposed by Mann et al. make use of the physiological signals to classify images as "important" (i.e., causing rapid change in a biological response) or "unimportant" (i.e., not causing rapid change in a biological response), and trigger the wearable camera to store and/or transmit only the "important" images. However, their systems have several shortcomings.

The described systems do not associate, do not store, and do not transmit the physiological signals, or any other "importance" identifier together with the corresponding images. As a result, the "important" images can be easily lost among other images in a database, since there is nothing in these "important" images to indicate that these images are "important". This can happen, for example, when the digital image files are used on a different system, when the images are transferred via a recordable contact disk or other media, when the images are uploaded to an on-line photo service provider, etc. The described systems also do not associate, do not store, and do not transmit the user's identifier together with the corresponding images. Therefore, when the system is used by more that one user, it is unable to distinguish which user reacts to the image as "important".

Further, the described systems provide only binary classification "important-unimportant" and do not allow a finer differentiation of the relative degree of importance between the captured images. As a result, after a certain time of acquiring images in the user's database, the number of important images becomes too large to serve the purpose of the importance attribute, unless the user will change the attribute for every image in his or her database, which is a lengthy and tiresome process.

Additionally, the described systems provide image classification only based on the general "importance" attribute. For example, they are unable to differentiate whether the important image evoked a positive (happy) or negative (unhappy) reaction in the user. Therefore, a wide range of human emotional reactions (e.g., joy, sadness, anger, fear, interest, etc.) is not considered in the system and cannot be applied to the advantage of the user.

Consequently, a further need exists for an improved method for obtaining affective information and for using the affective information to facilitate storage and retrieval of images.

SUMMARY OF THE INVENTION

In one aspect of the present invention, an imaging method is provided. In accordance with this embodiment, an image of a scene is captured. Affective information is collected at capture. The affective information is associated with the scene image.

In another aspect of the invention another embodiment of an imaging method is provided. In this embodiment, an image of a scene is captured. Affective signals are collected at capture. The relative degree of importance of the captured image is determined based at least in part upon the collected affective signals. The relative degree of importance is associated with the scene image.

In another aspect of the invention a photography method is provided. In accordance with this method an image of a scene is captured. An image of at least a part of a photographer is obtained at capture. Affective information is determined based at least in part on interpretation of the image of the photographer. Affective information is associated with the scene image.

In still another aspect of the invention, an imaging method is provided. In accordance with this method, a stream of images is captured and a corresponding stream of affective information is collected during image capture. The stream of affective information is associated with the stream of images.

In yet another aspect of the invention, a method for determining affective information is provided. In accordance with this method affective signals are obtained containing facial characteristics and physiological characteristics of a person. The facial characteristics are analyzed and the physiological characteristics are analyzed. The emotional state of the person is determined based upon analysis of the facial and physiological characteristics of the person.

In still another aspect of the invention, an imaging system is provided. The imaging system has an image capture system adapted to capture an image selected by a user. A memory stores the image. A set of sensors is adapted to capture affective signals from the user at capture. A processor is adapted to associate the affective information with the captured image.

DETAILED DESCRIPTION OF THE INVENTION

Figure 1A:
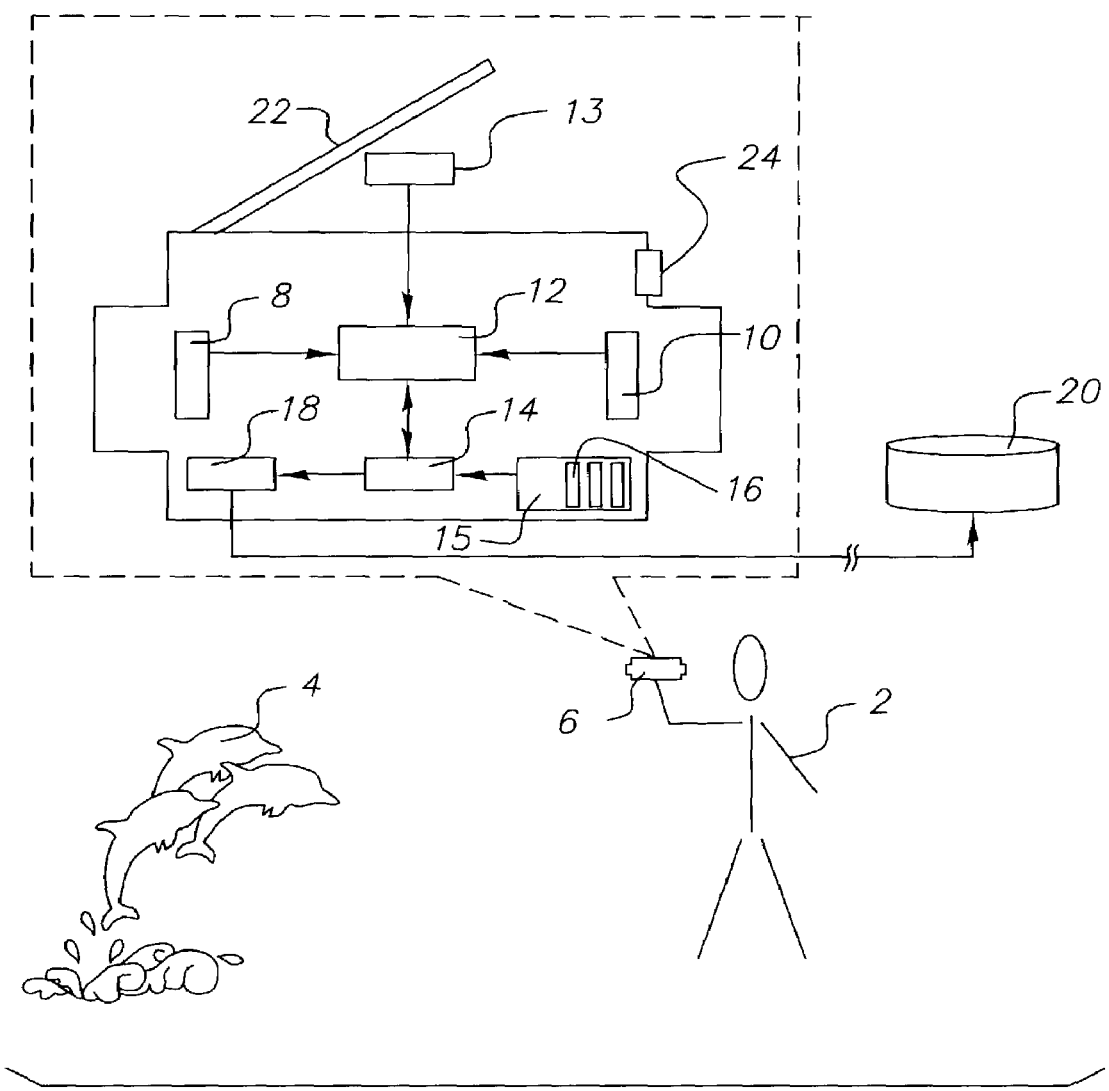
FIG. 1a shows a handheld embodiment of an image capture system in accordance with the present invention.

The present invention provides a method for collecting affective information as a user views a scene and associating this information and its interpretation with a captured image of the specified scene. Interpretation of affective information can provide several gradations of user's preference (e.g., the degree to which the user likes the scene). It also can provide a relative degree of importance of the scene to the user. Additionally, interpretation of affective information can be done in terms of the specific emotion (e.g., happiness, sadness, fear, anger, etc.) evoked by the scene.

A scene is defined as something seen by a viewer. It can be the place where an action or event occurs, an assemblage of people and/or objects seen by a viewer, a series of actions and events, a landscape or part of a landscape, etc. Scenes recorded or displayed by an image capture device are referred to as images of scenes. Examples of image capture devices include digital still cameras, a handheld video cameras, a wearable video cameras, a conventional photographic cameras that record images such as still or motion picture images on a film, an analog video camera, etc. The user can observe scenes directly, through a camera's viewfinder, or on a camera preview screen serving as a viewfinder.

As used herein the terms image and images include but are not limited to still images, motion images, multi-perspective images such a stereo images or other depth images, and other forms of immersive still and motion images.

People capture images of different scenes for a variety of purposes and applications. Capturing memorable events is one example of an activity that ordinary people, professional photographers, or journalists alike have in common. These events are meaningful or emotionally important to an individual or a group of individuals. Images of such events attract special attention, elicit memories, and evoke emotions, or, in general terms, they produce psychological reactions. Often these psychological reactions are accompanied by physiological and/or behavior changes.

Information that represents user's psychological, physiological, and behavioral reactions to a particular scene or an image of the scene, is referred to herein as affective information. Affective information can include raw physiological and behavioral signals (e.g., galvanic skin response, heart rate, facial expressions, etc.) as well as their psychological interpretation (e.g., preferred, not preferred, etc.), and association with an emotional category (e.g., fear, anger, happiness, etc.). The affective information is changed when a user's psychological reaction is changed. This can happen, for example, when a user suddenly sees a dangerous accident, an amazing action, or a beautiful landscape.

Affective tagging is defined as the process of determining affective information, and storing the affective information in association with images of a particular scene. When the affective information is stored in association with user identification data, it is referred to herein as "personal affective information". The user identification data can be any type of information that is uniquely associated with a user. The user identification data can be a personal identification code such as a globally unique ID (GUID), user number, social security number, or the like. The user identifier can also be a complete legal name, a nickname, a computer user name, or the like. The user identification data can alternatively include information such as a facial image or description, fingerprint image or description, retina scan, or the like. The user identification data can also be an internet address, cellular telephone number or other identification.

When the personal affective information is stored in association with the corresponding image, it is referred to as "personal affective tag". The affective information and user identifier are types of image "metadata", which is a term used for any information relating to an image. Examples of other types of image metadata that can be incorporated in the personal affective information that is stored in the affective tag include information derived from scene images and non-image data such as image capture time, capture device, capture location, date of capture, image capture parameters, image editing history etc.

The personal affective information can be associated with a digital image by storing the personal affective information within the image file, for example using a Tagged Image File Format IFD within an Exif image file. Alternatively, the affective information can be stored in one or more application segments in a Joint Photographic Export Group file containing the first image (or alternatively the second image) in accordance with the JPEG standard format ISO 10918-1 (ITU-T.81). This allows a single, industry standard image file to contain both a JPEG compressed first image stored as a normal JPEG image, and the affective information to be stored in a proprietary form that is ignored by normal JPEG readers. In still another alternative, the personal affective information can be stored in a database that is separate from the image. This information can also be stored along with security and access permission information to prevent unauthorized access to the information.

Affective tagging can be done either manually or automatically, as a user views a particular scene or images of the scene using an image capture device. In the case of the manual affective tagging, user can enter affective information by using manual controls, which can include for example, camera's control buttons, touch-screen display, or voice recognition interface to provide his/her reaction to the scene. For example, in the case of a surprise, the user might "click" a camera's button representing "surprise" reaction, or simply say a keyword such as "Wow!".

In the case of automatic affective tagging, an image capture device can use one of the following affective signals or their combinations to collect affective information, which can be subsequently interpreted:

Eye movement characteristics (e.g., eye fixation duration, pupil size, blink rate, gaze direction, eye ball acceleration, features and parameters extracted from the eye movement patterns, their complexity, etc.);

Biometric or physiological responses (e.g., galvanic skin response (GSR), hand temperature, heart rate, electromyogram (EMG), breathing patterns, electroencephalogram (EEG), brain-imaging signals, etc.);

Facial expressions (e.g., smile, frowns, etc.);

Vocal characteristics (e.g., loudness, rate, pitch, etc.);

Body gestures including facial movements (e.g., pinching bridge of the nose, rubbing around ears, etc.).

In accordance with one embodiment of this invention described below, affective information is determined automatically based on facial expression, eye fixation duration, and galvanic skin response. Other combinations can also be used.

Figure 1B:
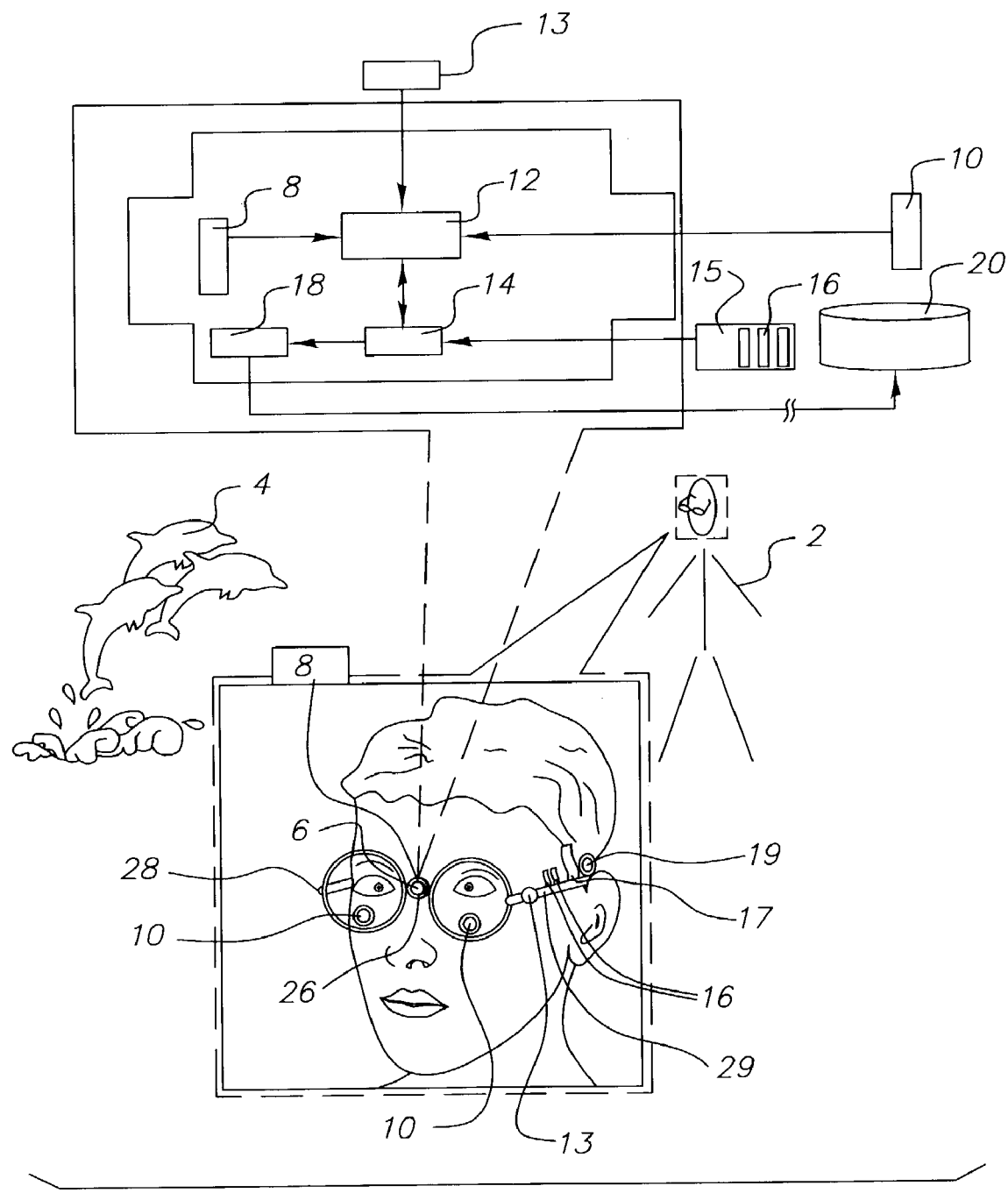
FIG. 1b shows a wearable embodiment of an image capture system in accordance with the present invention.
Figure 1C:
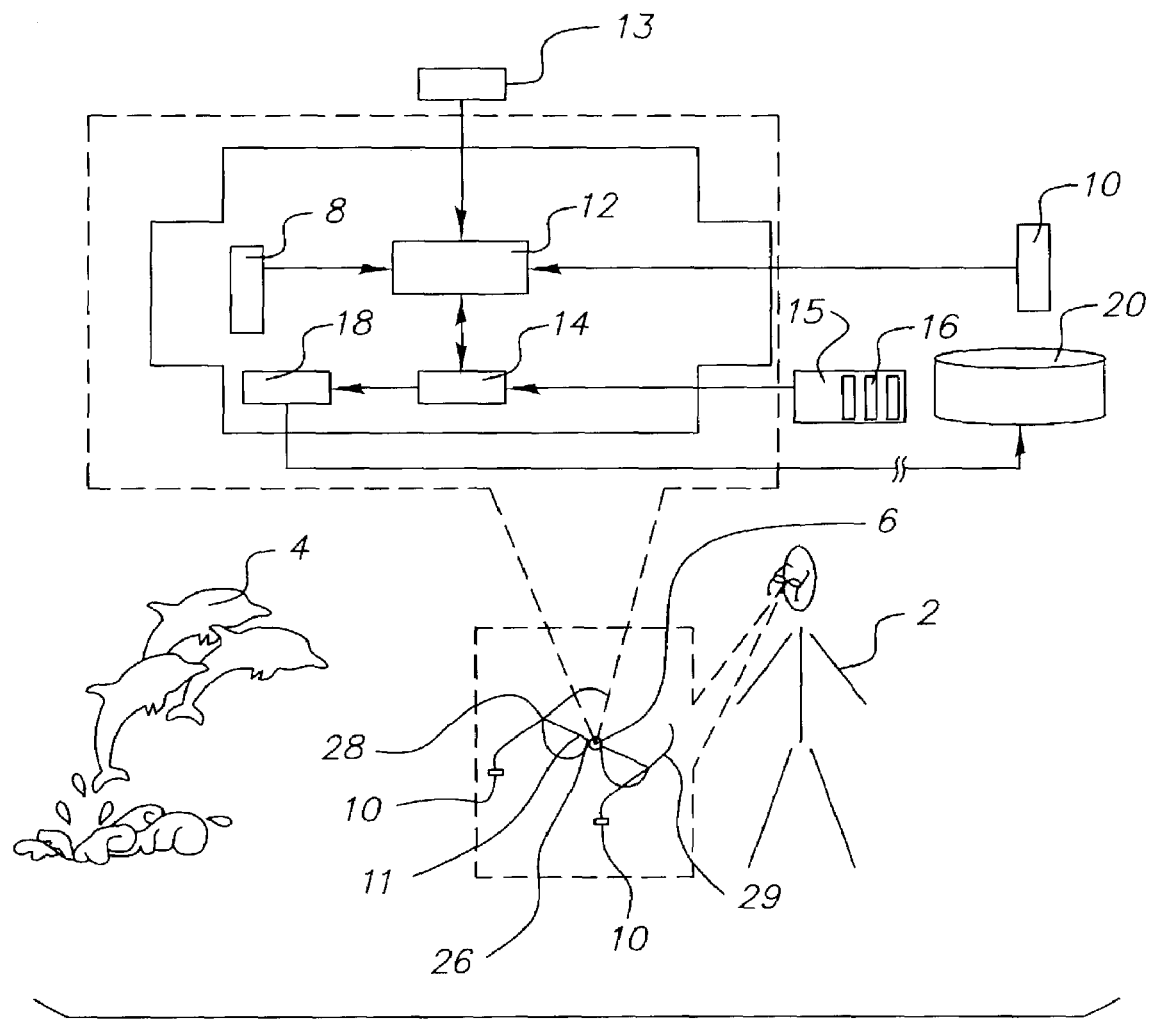
FIG. 1c shows another wearable image capture system for creating affective information in association with a scene at the moment of capture.

Referring to FIGS. 1a–1c, there are illustrated three example embodiments of image capture systems made in accordance with the present invention. The system depicted in FIG. 1a is a handheld image capture device 6 in possession of a particular user 2, who views a scene 4 either directly, or through a viewfinder 24, or on a preview screen 22. It is understood that a digital still camera, handheld digital video camera, wearable video camera, etc. may be considered as the image capture device 6. Examples of wearable embodiments of image capture device 6 are shown in FIG. 1b and FIG. 1c.

Image capture device 6 includes a capture module 8 to capture images of the scene 4. The capture module 8 includes a taking lens (not shown), an image sensor (not shown) and an A/D converter (not shown). The capture module can also include a microphone (not shown), audio amplifier (not shown), and audio A/D converter (not shown). Capture module 8 provides digital still or motion image signals and associated digital audio signals. Image capture device 6 also includes a central processing unit (CPU) 14 and a digital storage device 12, that can store high-resolution image files such as digital still or digital motion images provided by the capture module 8 as well as associated metadata. Digital storage device 12 can be a miniature magnetic hard drive, Flash EPROM memory, or other type of digital memory.

Image capture device 6 is shown adapted with a communication module 18 such as a wireless modem or other communication interface that exchanges data including digital still and video images using a communication service provider, such as an Internet service provider 20. Communication module 18 can use a standard radio frequency wireless communication systems, for example, the well-known Bluetooth system or the IEEE Standard 802.15 system, a digital paging system, a conventional cellular telephone system or other wireless systems. Alternatively communication module 18 can exchange information with other devices using infrared, laser, or other optical communication schemes. In still another alternative embodiment, image capture device 6 can have a communication module 18 that is adapted to use data exchange hardware such as a Uniform Serial Bus cable, IEEE Standard 1394 cable, other electrical data paths such as a wire or set of wires, a waveguide, or an optical data path to permit information including digital images and affective information to be exchanged between image capture device 6 and other devices.

In order to provide affective information, image capture device 6 includes manual controls 13 and a set of sensors 15 that can detect a user's physiological signals. User 2 can enter affective information by using controls 13, which can include for example, manual control buttons, touch-screen display, or a voice or gesture recognition interface.

Affective information can also be gathered by a set of sensors 15. For example, in the embodiment shown in FIG. 1a, the set of sensors 15 include galvanic skin response sensors 16 that are mounted on the surface of the image capture device 6. In wearable embodiments any of the set of sensors 15 can be mounted elsewhere as shown in FIG. 1b, where galvanic skin response sensors 16 are located on the sidepiece 29 of a conventional frame 28 used for supporting glasses. The set of sensors 15 can also include a vascular sensor 17, usefully incorporated on a portion of the sidepiece 29 proximate to the arteries in the temple of the head of the user thus facilitating measurement of temperature and/or heart rate readings. The set of sensors 15 can also include a vibration sensor 19 as is depicted in FIG. 1b proximate to the ears and can be adapted to detect audible vibration proximate to the ear or by way of contact with the ear. Vibration sensor 19 can be adapted to detect both sounds emanating from the user and sounds that emanate from other sources. Any of the set of sensors 15 can be located in other useful arrangements. Any one of the set of sensors 15 can be miniaturized so that their presence would not alter the appearance of a wearable embodiment of image capture device 6. For example, as is shown in the embodiment of FIG. 1c sensors 16 for detecting galvanic skin response are a part of a wearable image capture device 6 mounted on a bridge 26 of a conventional frame 28.

In other embodiments, the set of sensors 15 can comprise neural sensors and other devices adapted to monitor electrical activity from nerve cells to allow for interaction with the environment. Examples of such sensors 15 include as the brain communicator and the Muscle Communicator sold by Neural Signals, Inc., Atlanta Ga., U.S.A. These devices monitor, respectively, electrical signals at a nerve cell and signals radiated by certain nerves to detect the signals that are used for example to cause an average person to move an extremity. These signals are transmitted to a computer, where software decodes the signals into useful information. It will be appreciated that such technology can be used to detect affective information as well as other information useful in determining affective information. For example, neural activity along a nerve carrying sound information from an ear can be monitored and used to determine audio information that reflects what the observer actually heard at an event.

Image capture device 6 also includes a user camera 10, which is used to record video images of eye movements, pupil size, and facial expressions of the user 2. User camera 10 can incorporate for example a conventional charge couple device imager, a complimentary metal oxide imager or a charge injection device. Other imaging technologies can also be used. The images that are captured by user camera 10 can include video images for forming an image of the user or some feature of the user's face. The images that are captured by user camera 10 can also include other forms of video images from which affective information can be obtained. For example, images that represent eye position and pupil size do not need to constitute full digital images of a user's eye. Instead other forms of imaging can be used that have lower resolution or a non-linear imaging pattern in order to reduce costs or to simplify the imaging structure The video images captured by user camera 10 are stored on the digital storage device 12 prior to processing by the CPU 14. User video camera 10 can include, for example, an infrared sensitive camera. In this embodiment, a set of infrared light emitting diodes (infrared LEDs) direct infrared light toward the pupils of user. User video camera 10 detects infrared signals radiated by the eyes of the user. The pupils are then are tracked from the facial image of the user. One example of a useful user video camera 10 is the Blue Eyes camera system developed by International Business Machines, Armonk, N.Y., U.S.A. Another useful example of a user camera 10 is the Eyegaze System sold by LC Technologies, Inc., Fairfax, Va., U.S.A. A version of the remote tracking eye-tracking camera ASL model 504 sold by Applied Science Laboratories, Boston, Mass., USA, can also be used. Other useful embodiments of user camera 10 are shown and described in greater detail in commonly assigned U.S. patent application Ser. No. 10/303,978 entitled "Camera System With Eye Monitoring" filed by Miller et al. on Nov. 25. 2002.

User video camera 10 can be attached to or located inside of the handheld image capture device 6 as shown in FIG. 1a, on a head mounted frame 28 such as the wearable image capture device 6 as shown in FIG. 1b, or on a remote frame of the wearable image capture device 6 as shown in FIG. 1c. In the case of FIG. 1c user video camera 10 is especially suitable for capturing a variety of facial features of the user, including pupil size, eye and brow movements. In the case depicted on FIG. 1b, it is best suited for capturing eye movements and other eye characteristics. User video camera 10 can also be separate from image capture device 6, and in this embodiment user video camera 10 can comprise any image capture device that can capture an image of user of image capture device 6 and transfer this image to the image capture device. The transfer of images from a remote user video camera 10 can be done wirelessly using any known wireless communication system.

Feature tracking can be performed using various algorithms, such as for example, described in an article entitled "Facial Feature Tracking for Eye-Head Controlled Human Computer Interface", published in Proceedings of IEEE TENCON, 1999, pp. 72–75 by Ko et al). This algorithm, capable of real-time facial feature tracking, composes complete graph using candidate blocks it identifies from a processed facial image, and then computes a measure of similarity for each pair of blocks. The eyes are located as the blocks having the maximum similarity. Based on the eye position, the mouth, lip-corners and nostrils are located. The located features are tracked.

One example of a wearable image capture device 6 having a user video camera 10 that is adapted to record eye movements can be found, for example, in an article entitled "Oculomotor Behavior and Perceptual Strategies in Complex Tasks" published in Vision Research, Vol. 41, pp. 3587–3596, [2001] by Pelz et al. The article describes a wearable lightweight eyetracker in the form of a head-gear/goggles, which include a module containing an infrared illuminator, a miniature video eye camera, and a beam-splitter to align the camera to be coaxial with the illuminating beam. Retro-reflection provides the pupil illumination to produce a bright-pupil image. An external mirror folds the optical path toward the front of the goggles, where a hot mirror directs the IR illumination toward the eye and reflects the eye image back to the eye camera. A second miniature camera is mounted on the goggles to capture a scene image from the user's perspective.

In both FIG. 1b and FIG. 1c user video camera 10 is shown as consisting consists of two pieces, which enable capture of eye characteristics of both eyes. It is however understood that user video camera 10 may be represented by one piece that captures the eye characteristics of both or only one of the eyes of user 2.

Image capture device 6 is provided with appropriate software which is utilized by CPU 14 for creating and using personalized affective information. This software is typically stored on digital storage device 12, and can be uploaded or updated using communication module 18. In addition, software programs to enable CPU 14 to perform image processing and analysis pertaining to non-affective information, which can be extracted from images of the scene provided by capture module 8, is also stored on the digital storage device 12. In addition, the digital storage device 12 can also store information with respect to a personal user profile, which could be a specific database that includes information summarizing characteristics of user's reactions such as, for example, quantitative information about typical reaction patterns, as well as a software program to enable CPU 14 to access this specific database. This personal user profile can be queried by CPU 14 when creating and using personalized affective information. The personal user profile is updated by new information that is learned about the reactions of user 2.

It is understood that all parts and components of image capture device 6 discussed above may be implemented as integral parts of the image capture device 6 or as physically separate devices connected with wires or wirelessly.

The following describes various embodiments of methods for image capture device 6 to determine affective information based on analysis of facial characteristics such as a degree of preference extracted from facial expression; or an emotional category and the degree of distinctiveness extracted from a facial expression. Other embodiments show methods for determining affective information based upon physiological information such as a degree of interest extracted from pupil size and eye movements or a degree of excitement extracted from galvanic skin response. Further embodiments show methods for using a combination of facial analysis and physiological information to derive affective information.

Figure 2A:
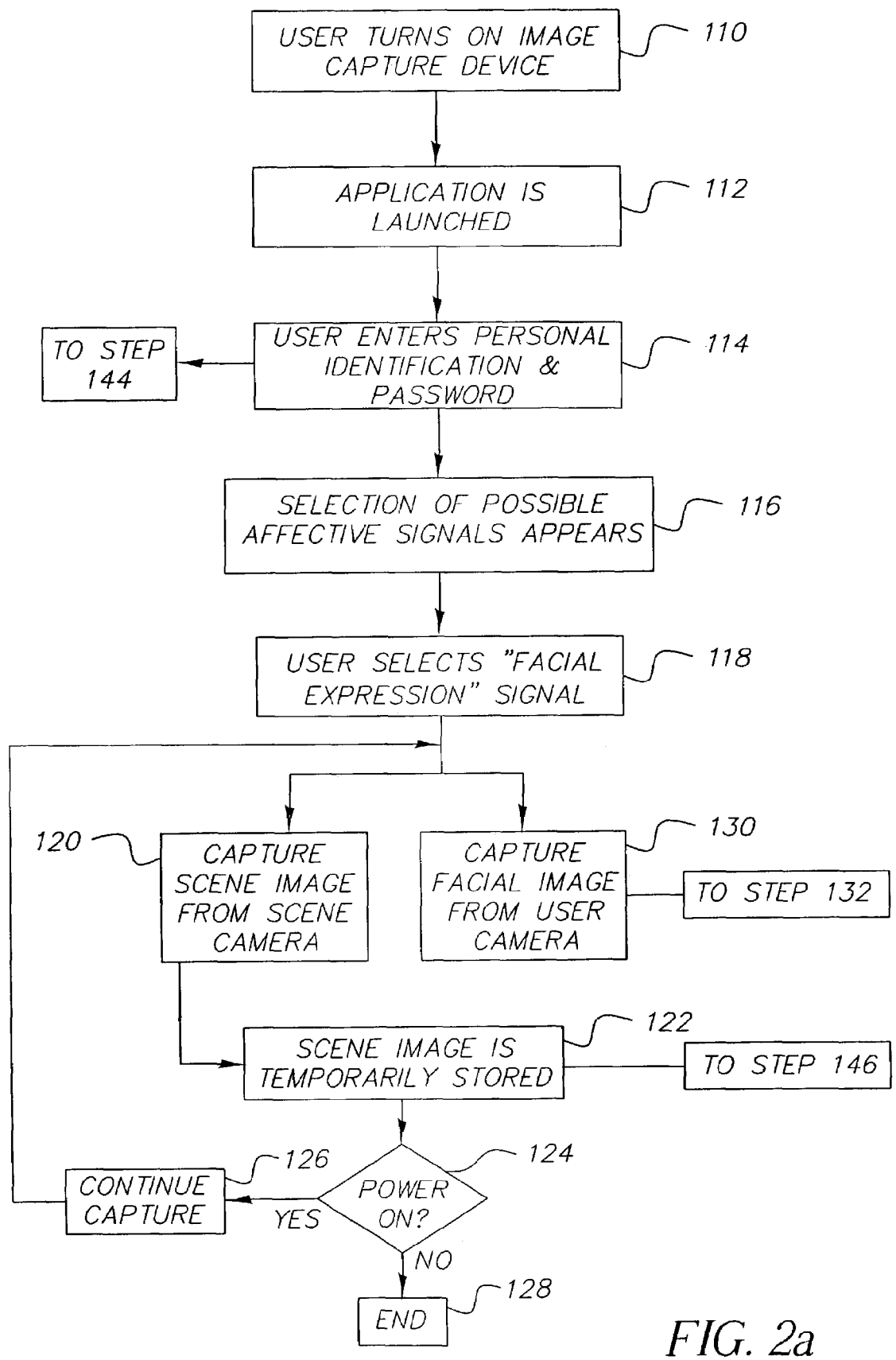
FIGS. 2a and 2b comprise a flow diagram showing one embodiment of the invention where providing affective information is provided based on analysis of facial expressions.
Figure 2B:
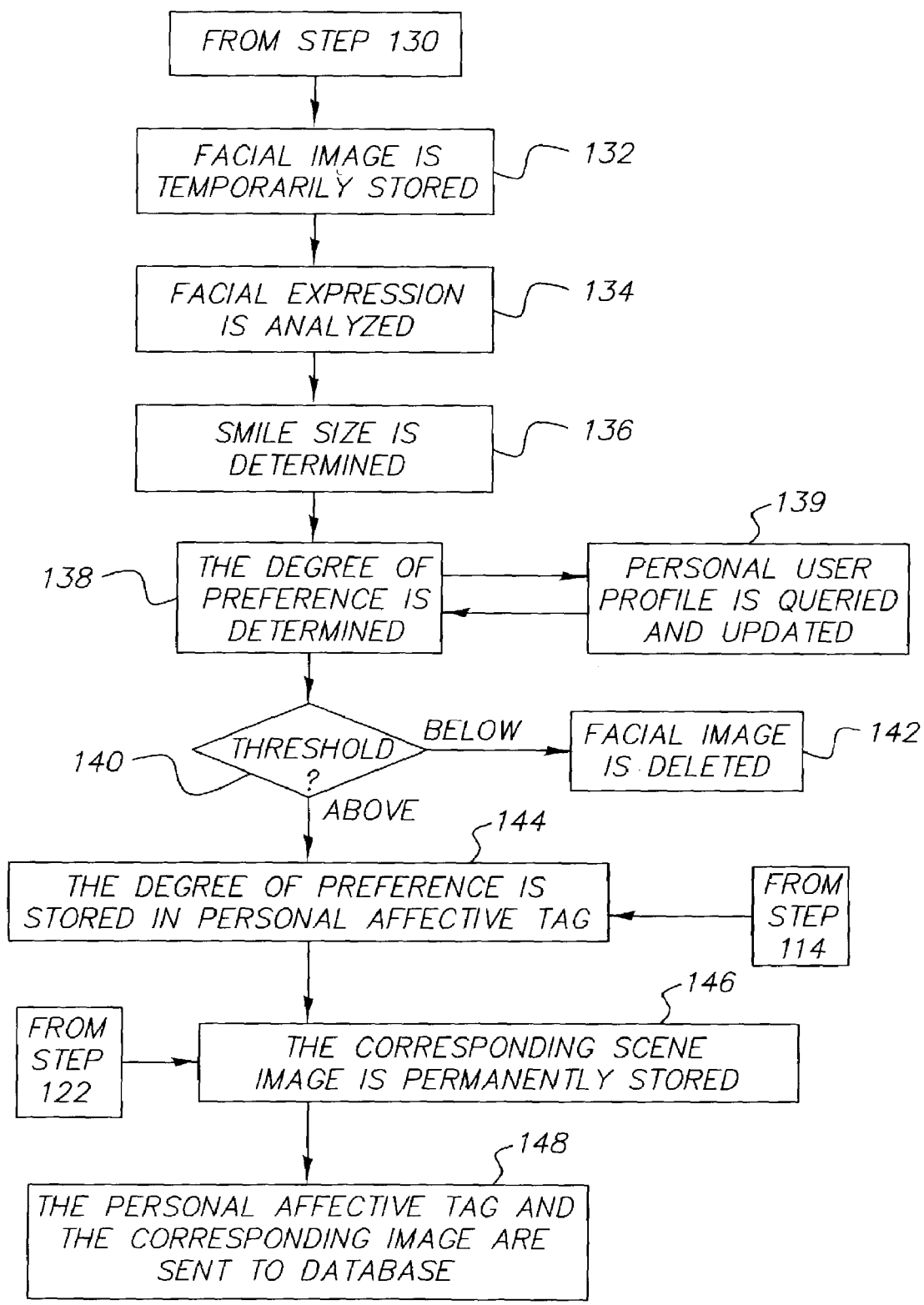

Referring to FIGS. 2a and 2b, there is shown a flow diagram illustrating an embodiment of a method of the present invention for providing affective information based on the degree of preference of a particular user for a subset of images of a particular scene. In this embodiment, affective information is determined based on facial expression of the particular user.

User 2 first activates the image capture device 6 (step 110). In a preferred embodiment, the software application that implements the method of the present invention is already installed in the image capture device 6 and it is launched automatically (step 112). Alternatively, the user can start the application manually, by using appropriate control buttons (not shown) on the image capture device 6.

User 2 enters user identification data such as a user ID and password (step 114). In an alternative embodiment, the user video camera 10 is used in conjunction with face recognition software to automatically determine the identity of user 2, and to provide an appropriate user identifier, such as the user's name, personal identification code or other identifier. In another alternative embodiment user identification data can be obtained from data sources that are external such as a radio frequency transponder to capture device 6 using, for example, communication module 18. In a further alternative embodiment, image capture device 6 is pre-programmed with user identification data and step 114 is not required.

Image capture device 6 optionally provides a selection of signals that can be recorded in order to determine the user's emotional reaction as they view scenes (step 116). The user selects the desirable signal, i.e., facial expression in this case (step 118). In an alternative embodiment, the image capture device 6 is preprogrammed to use one or more affective signals, and steps 116 and 118 are not required.

User 2 then directs the imaging device to compose the scene to be captured. The capture module 8 captures the first image of a scene (step 120) and, simultaneously the user video camera 10 captures the first facial image of the user 2 (step 130).

Image capture device 6 temporarily stores the scene image (step 122) and the facial image (step 132), and automatically analyses the facial expression of user 2 (step 134). Facial expressions can be analyzed using a publicly disclosed algorithm for facial expression recognition such as an algorithm described in an article entitled, "Facial Expression Recognition Using a Dynamic Model and Motion Energy", published in Proceedings of the ICCV 95, Cambridge, Mass., 1995 by Essa et al. This algorithm is based on knowledge of the probability distribution of the facial muscle activation associated with each expression and a detailed physical model of the skin and muscles. This physics-based model is used to recognize facial expressions through comparison of estimated muscle activations from the video signal and typical muscle activations obtained from a video database of emotional expressions.

Facial expressions can also be analyzed by means of other publicly available algorithms. One example of such an algorithm is found in "Detection, Tracking, and Classification of Action Units in Facial Expression," published in Robotics and Autonomous Systems, Vol. 31, pp. 131–146, 2000 by J. J. Lien, et al. Another similar algorithm is found in an article entitled "Measuring facial expressions by computer image analysis", published in Psychophysiology, Vol. 36, pp. 253–263 by Bartlett et al. [1999]. These algorithms are based on recognizing specific facial actions—the basic muscle movements—which were described in a paper entitled "Facial Action Coding System", published in Consulting Psychologists Press, Inc., Palo Alto, Calif. by Ekman et al. [1978]. In the Facial Action Coding System (FACS), the basic facial actions can be combined to represent any facial expressions. For example, a spontaneous smile can be represented by two basic facial actions: 1) the corners of the mouth are lifted up by a muscle called zygomaticus major; and 2) the eyes are crinkled by a muscle called orbicularis oculi. Therefore, when uplifted mouth and crinkled eyes are detected in the video signal, it means that a person is smiling. As a result of the facial expression analysis, a user's face can be recognized as smiling when a smile on user's face is detected, or not smiling when the smile is not detected.

Image capture device 6 determines the smile size (step 136). If the smile is not detected, the smile size equals 0. If a smile has been detected for a given image, a smile size for this image is determined as the maximum distance between mouth corners within first three seconds after the onset of the specified image divided by the distance between the person's eyes. The distance between the eyes of user 2 is determined using the facial recognition algorithms mentioned above. The necessity of taking the ratio between the size of the mouth and some measure related to the head of user 2 (e.g. the distance between the eyes) stems from the fact that the size of the mouth extracted from the facial images depends on the distance of user 2 to user video camera 10, position of the head, etc. The distance between the eyes of user 2 is used to account for this dependency, however, other measures such as the height or width of the face, the area of the face and other measures can also be used.

Image capture device 6 determines the degree of preference (step 138). If the smile was not detected, then the smile size and consequently the degree of preference is equal to 0. If the smile was indeed detected, the absolute degree of preference corresponds to the smile size. The relative degree of preference is defined as the smile size divided by an average smile size associated with a personal user profile for user 2. The average smile size data in the personal user profile can be constantly updated and stored on digital storage device 12. The personal user profile with respect to average smile size can be then updated using the smile size data (step 139).

The obtained degree of preference is compared to a threshold value established by user 2. (step 140). If the obtained degree of preference is above the threshold value, then image capture device 6 creates a personal affective tag for the corresponding image which indicates a preference for this particular captured image (step 144). In another embodiment the threshold value for the degree of preference could also be established automatically from the personal user profile, for example, on the basis of the prior cumulative probabilities for the user's degrees of preference distribution. In one embodiment such a probability could be equal to 0.5, and thus, the threshold value for the degree of preference would correspond to the value that occurs in at least 50% of the cases. In yet another embodiment, the personal affective tag can include a value selected from a range of preference values, enabling the differentiation of the relative degree of preference between various captured images.

Image capture device 6 stores the corresponding image and the personal affective tag, which indicates the degree of preference, within the image file containing the scene image, as part of the image metadata (step 146). Alternatively, the personal affective tag, which indicates the degree of preference, can be stored in a separate file in association with the user identification data and the image identifier. When this is done, data is stored in the image metadata indicating the location of the file. In addition, the information about the date that user 2 views a certain image (i.e. immediately upon capture) can be also recorded as a separate entry into the personal affective tag.

In another embodiment the raw facial images are stored as affective information either in a separate file on the image capture device 6 together with the image identifier and the user identifier, or in the personal affective tag as part of the image metadata, and the analysis is done at a later time and optionally using a separate system. For example, the scene image and raw facial image can be communicated using the communication module 18 (see FIG. 1) and the Internet Service Provider 20 to a separate desktop computer (not shown) or computer server (not shown), which can perform the analysis described earlier in relation to steps 134–138.

The corresponding image, the personal affective tag and any other image metadata are sent using the communication module 18 to a personal database of digital images (step 148). This personal database of images can be stored, for example, using separate desktop computer (not shown) or computer server (not shown).

In the embodiment shown, if the obtained degree of preference is below the threshold value the facial image of the user is deleted (step 142). In another embodiment, if the obtained degree of preference is below the threshold value and if user 2 is still viewing the same scene or a captured image of the scene, such as for example on preview screen 22, image capture device 6 can optionally capture the next facial image and repeat steps 132 through 140 to determine if user 2 has changed her facial expression as user 2 views the same scene or the captured image of the scene.

If the threshold value is set to 0, all scene images and corresponding affective information (degree of preference or in another embodiment, raw facial image) recorded by the image capture device 6 will be stored as described above.

If the user keeps the power turned on, (step 124) the process of capturing the next image of the scene (steps 120–124) are repeated and simultaneously the steps of determining and storing a personal affective tag for the captured image (steps 130–146) are repeated (step 126).

Image capture device 6 continues recording images of the scene 4 using capture module 8 and facial images of user 2 using user video camera 10, as long as user 2 keeps the image capture device 6 powered on. If the power is turned off, image capture device 6 stops recording the images of the scene and the facial images and also ends the process of affective tagging (step 128).

The degree of preference can be used in a digital imaging system to rank images in a systematic and continuous manner as favorite images for a specified user as described in commonly assigned U.S. patent application Ser. No. 10/036,113, filed Dec. 26, 2001, entitled "Method for Creating and Using Affective Information in a Digital Imaging System" by Matraszek et al. and in commonly assigned U.S. patent application Ser. No. 10/036,123, filed Dec. 26, 2001, entitled "Method for Using Affective Information Recorded With Digital Images for Producing an Album Page" by Matraszek et al., the disclosures of which are incorporated herein by reference.

In another embodiment, a binary degree of preference for images of a scene can be determined. When the smile is detected in step 136, the corresponding image is then classified as preferred with the binary degree of preference equals 1. Alternatively, when the smile is not detected, the image is classified as not preferred with the degree of preference equals 0.

The determined affective information in terms of the binary degree of preference is then stored as a personal affective tag, which includes the user identification data as part of the image metadata. It can also be stored in a separate file on digital storage device 12 together with the image identifier and the user identification data. In addition, affective information in terms of the actual image(s) of the user's facial expression can also be stored in a separate file in association with the image identifier and the user identification.

In another embodiment, captured images are transferred by image capture device 6 to the Internet Service Provider 20 only when the affective information exceeds a threshold, such as a threshold for the relative smile size. As a result, only images which exceed a preference threshold, are stored in the user's personal database of images. In this embodiment, metadata is stored in the image files that indicate that such files met the preference threshold.

Figure 3A:
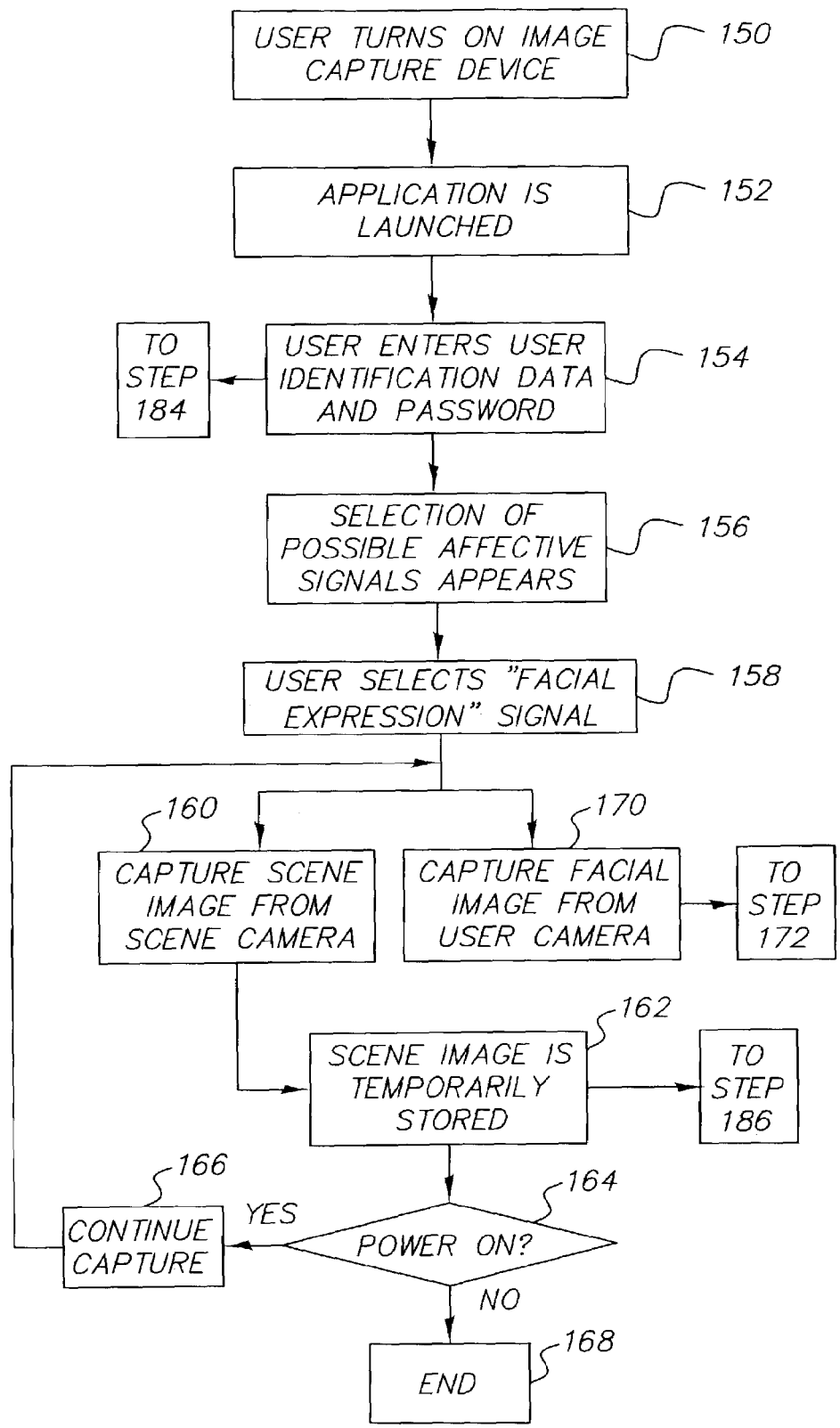
FIGS. 3a and 3b comprise a flow diagram showing an embodiment of a the invention where affective information is provided based on analysis of facial expressions.
Figure 3B:
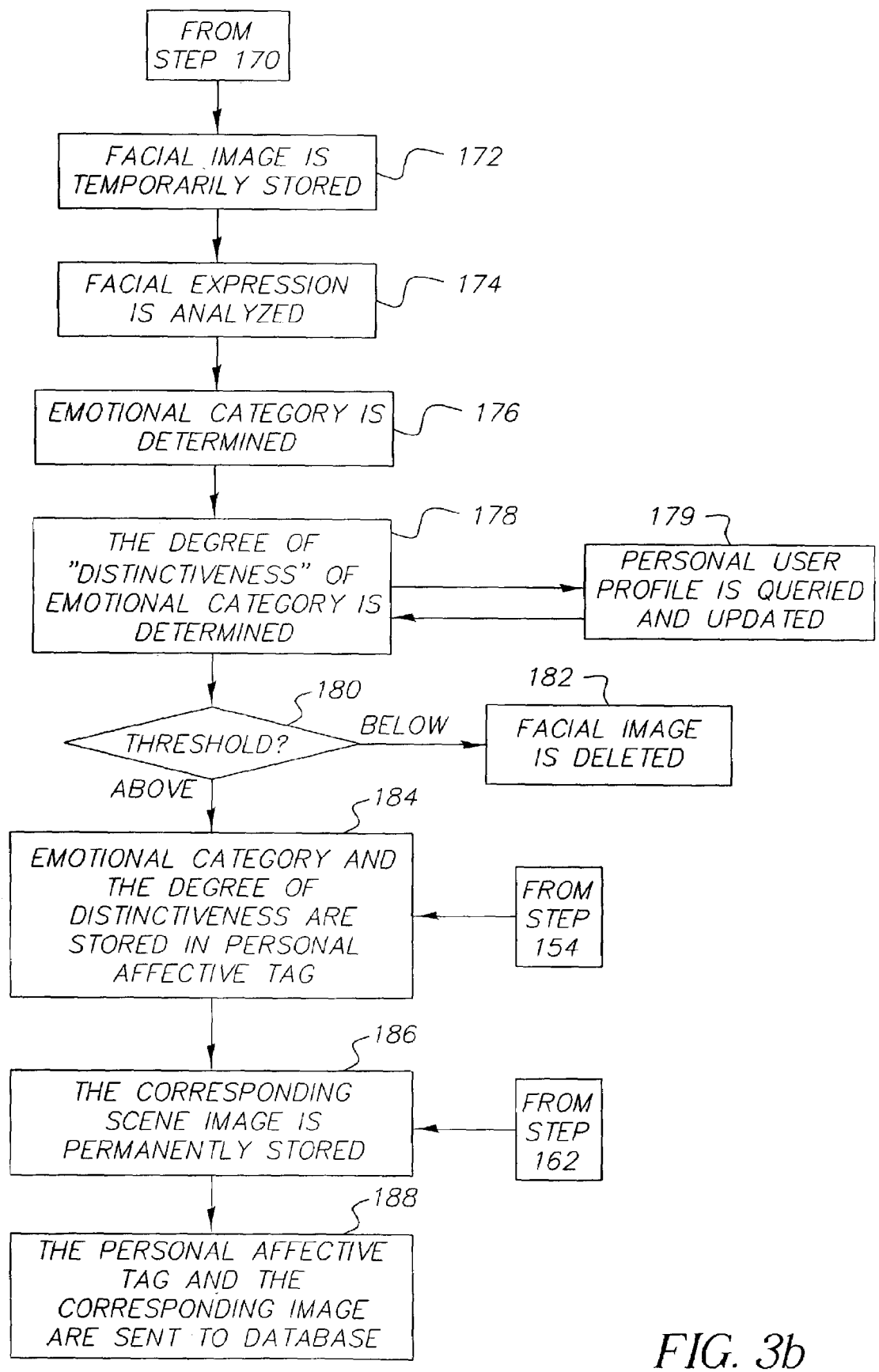

Referring to FIGS. 3a and 3b there is shown a flow diagram illustrating another embodiment of the present invention for providing affective information that characterizes the emotional category of the user's reaction, during image capture. In this embodiment, affective information is obtained based on the analysis of a user's facial expressions.

Yet in another embodiment, an emotional category for images of a scene can be determined. The facial expression may be classified into a broader range of emotional categories, such as 'happy', 'sad', 'disgust', 'surprised', etc. As a result of facial recognition, scenes that evoke 'happy' facial expressions are assigned the 'happy' emotional category; scenes that evoke 'sad' facial expressions are assigned the 'sad' emotional category, etc. Images of the scene can be further classified using a range of values for these categories, such as strongly happy, somewhat happy, neutral and somewhat sad, and strongly sad, etc.

The determined affective information in terms of the emotional category is then stored as personal affective tag, which includes the user identifier as part of the image metadata. It can also be stored in a separate file on the digital storage device 12 together with the image identifier and the user identifier.

Facial expressions may be classified into a broader range of emotional categories, such as 'happiness', 'sadness', 'disgust', 'surprise', etc. A publicly disclosed algorithm that categorizes facial expressions is described in an article entitled, "EMPATH: A Neural Network that Categorizes Facial Expressions", published in the Journal of Cognitive Neuroscience, 2002 by Dailey et al. The algorithm classifies facial expressions into six basic emotional categories: 'happy', 'sad', 'afraid', 'angry', 'disgusted', and 'surprised' based on developing a feedforward neural network consisting of three neuron layers performing three levels of processing: perceptual analysis, object representation, and categorization. In the model the first layer mimics a set of neurons with the properties similar to those of complex cells in the visual cortex. The units in the second layer extract regularities from the data. The outputs of the third layer are categorized into six basic emotions. As a result each facial expression will coded by six numbers, one for each emotion. The numbers, corresponding to different emotions are all positive and sum to 1, so they can be interpreted as probabilities.

The following method determines an emotional category based on a user's facial expression, and further provides a range of values for these categories, more specifically, the degree of "distinctiveness" of an emotional category is suggested and shown in FIGS. 3a and 3b. The degree of distinctiveness of an emotional category reflects a measure of uniqueness or "purity" of a particular emotion as opposed to fuzziness or ambiguity of the emotion. In common language such an emotion is often referred to as "mixed feelings".

Steps 150 through 172 of the embodiment of FIG. 3, generally correspond to steps 110 through 132 of the embodiment of FIG. 2.

In this embodiment image capture device 6 automatically analyzes the facial expression of user 2 by applying the neural network method described by Dailey et al (step 174). As a result, a user's facial expression is associated with six numbers, one for every basic emotion.

An emotional category (EC) is determined by choosing the category with the largest number (step 176). For example, if the numbers were 0.5, 0.01, 0.2, 0.1, 0.19 and 0 for 'happy', 'sad', 'afraid', 'angry', 'disgusted', and 'surprised', respectively, then the determined emotional category is happy, because it has the largest respective number 0.5. Consequently, scenes that evoke 'happy' facial expressions are assigned the 'happy' emotional category; scenes that evoke 'sad' facial expressions are assigned the 'sad' emotional category, etc.

Where several categories have the same number, one category can be randomly selected to be the facial expression. Alternatively, where several categories have the same number, other affective or non-affective information can be used to help select a category.

Image capture device 6 determines the degree of distinctiveness of the emotional category (step 178). The degree of distinctiveness ($DD_{EC}$) is computed from the numbers for six emotions established in the previous step 176, which are denoted for the convenience as N1, N2, N3, N4, N5, and N6. The following expression is used in the present invention for determining the degree of distinctiveness for the emotional category EC:

$$DD_{EC} = \sqrt{(N1^2 + N2^2 + N3^2 + N4^2 + N5^2 + N6^2)}$$

$DD_{EC}$ corresponds to the absolute degree of distinctiveness for the emotional category EC. The relative degree of distinctiveness is defined as the absolute degree of distinctiveness for the emotional category EC divided by an average value for the $DD_{EC}$ established in a user profile for the respective emotional category for the particular user. The average $DD_{EC}$ data in the user profile can be constantly updated and stored on digital storage device 12 as a part of a personal user profile for user 2. The personal user profile is queried and updated with respect to the average degree of distinctiveness of the emotional category $DD_{EC}$ (step 179).

The obtained degree of distinctiveness is compared to a threshold value established by user 2 or for user 2 (step 180). If the obtained degree of distinctiveness is above a threshold value, then, image capture device 6 creates a personal affective tag for the corresponding image which indicates an emotional category with the degree of its distinctiveness for this particular captured image (step 184).

In another embodiment the threshold value for the degree of distinctiveness could also be established automatically from the personal user profile, for example, on the basis of the prior cumulative probabilities for the user's degrees of distinctiveness distribution corresponding to a particular emotional category. In one embodiment such probability could be equal 0.5, and thus, the threshold value for the degree of distinctiveness would correspond to the value that occurs in at least 50% of the cases. In yet another embodiment, the personal affective tag can include a value selected from a range of distinctiveness values, enabling the differentiation of the relative degree of distinctiveness between various captured images.

Image capture device 6 stores the corresponding image and the personal affective tag, which indicates the emotional category with the degree of its distinctiveness, within the image file containing the scene image, as part of the image metadata (step 186). Alternatively, the personal affective tag, which indicates the emotional category with the degree of distinctiveness, can be stored in a separate file in association with the user identification data and the image identifier. In addition, the information about the date that the user views a certain image (i.e. immediately upon capture) can be also recorded as a separate entry into the personal affective tag.

In another embodiment the raw facial images are stored as affective information either in a separate file on the image capture device 6 together with the image identifier and the user identifier, or in the personal affective tag as part of the image metadata, and the analysis is done at a later time and optionally using a separate system. For example, the scene image and raw facial image can be communicated using the wireless modem 18 (see FIG. 1) and the Internet Service Provider 20 to a separate desktop computer (not shown) or computer server (not shown), which can perform the analysis described earlier in relation to steps 174–178.

The corresponding image, the personal affective tag and other image metadata are sent using the communication module 18 to Internet Service Provider 20, to a personal database of digital images (step 188). This personal database of images can be stored, for example, using separate desktop computer (not shown) or computer server (not shown).

In the embodiment shown, if the obtained degree of distinctiveness is below the threshold value the facial image of the user is deleted. (step 182) If the obtained degree of distinctiveness is below the threshold value and if user 2 is still viewing the same captured image, such as for example on preview screen 22, image capture device 6 can optionally capture the next facial image and repeat steps 172 through 180 to determine if user 2 has changed their facial expression as user 2 views the same scene or a captured image on preview screen 22.

If the threshold value is set to 0, all scene images and corresponding affective information (emotional category with the degree of distinctiveness or in another embodiment, raw facial image) recorded by the image capture device 6 will be permanently stored as affective information either in a separate file on the image capture device 6 together with the image identification data and the user identifier, or in the personal affective tag as part of the image metadata.

Image capture device 6 continues recording images of the scene 4 using capture module 8 and facial images of user 2 using user video camera 10, as long as user 2 keeps the image capture device 6 powered on. In step 168, if the power is turned off, the image capture device 6 stops recording the images of the scene and the facial images and also ends the process of affective tagging.

If user 2 keeps the power turned on, the process of capturing the next image of the scene (steps 160–166) and simultaneously determining and storing a personal affective tag for the captured image (steps 170–186) are repeated.

The emotional category and its degree of distinctiveness can be used in a digital imaging system to rank images in a systematic and continuous manner as emotionally significant or favorite images for a specified user as described in commonly assigned U.S. patent application Ser. No. 10/036,113, entitled "Method for Creating and Using Affective Information in a Digital Imaging System" by Matraszek et al. filed Dec. 26, 2001 and in commonly assigned U.S. patent application Ser. No. 10/036,123 entitled "Method for Using Affective Information Recorded With Digital Images for Producing an Album Page" by Matraszek et al., filed Dec. 26, 2001 the disclosures of which are incorporated herein by reference.

In another embodiment, only the emotional category for images of a scene can be determined without the degree of distinctiveness. When the emotional category is detected (step 174), the corresponding image is then classified by the specified emotion. However, if two or more emotional categories will have similar numbers produced by the computation in step 176, a neutral category can be assigned.

The determined affective information in terms of the emotional category is then stored as personal affective tag, which includes the user identification data as part of the image metadata. It can also be stored in a separate file on the digital storage device 12 together with the image identifier and the user identification data. In addition, affective information in terms of the actual image(s) of the user's facial expression can also be stored in a separate file in association with the image identifier and the user identification data.

Figure 4A:
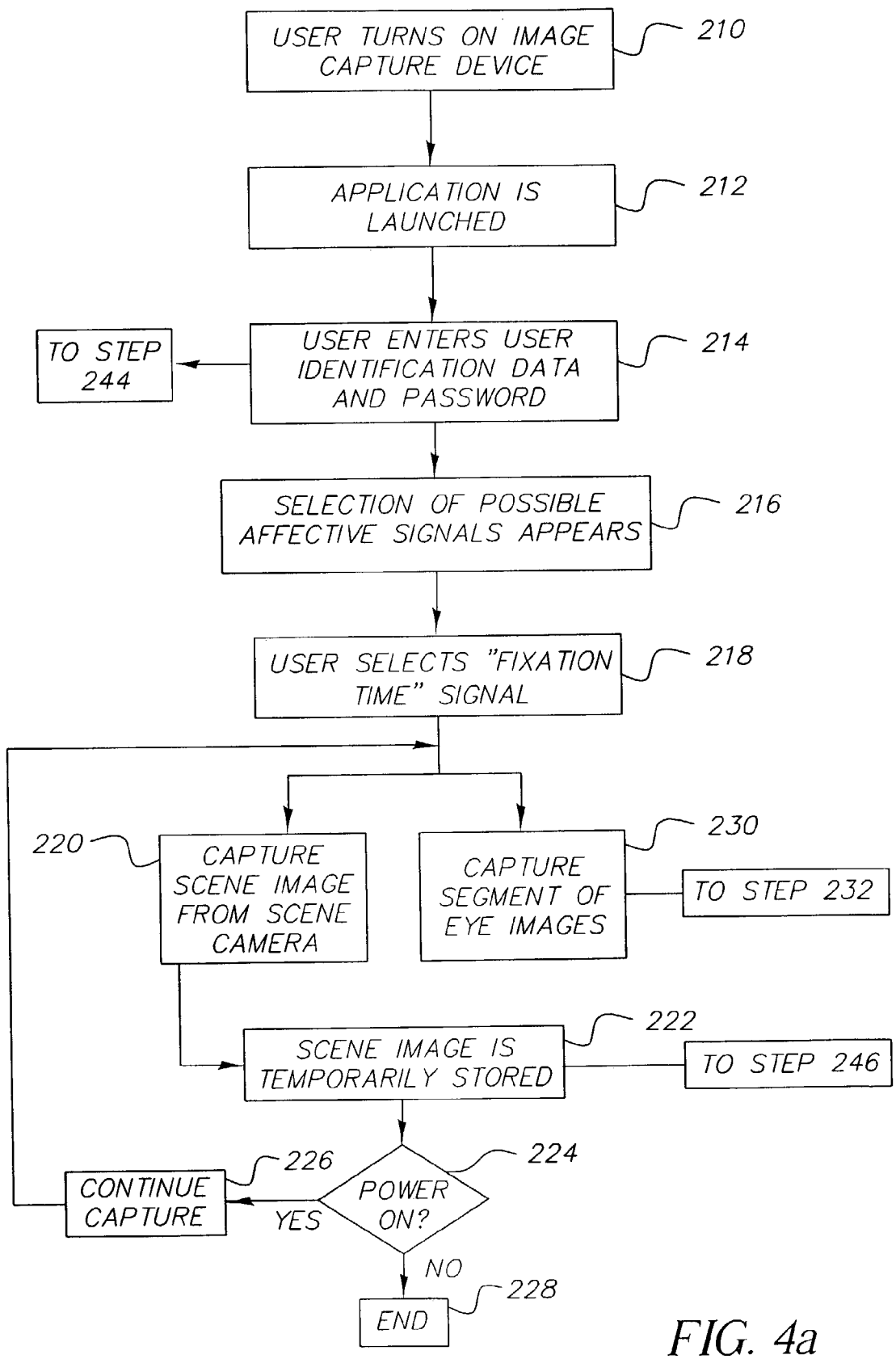
FIGS. 4a and 4b comprise a flow diagram showing an embodiment method where affective information is provided based on analysis of fixation time.
Figure 4B:
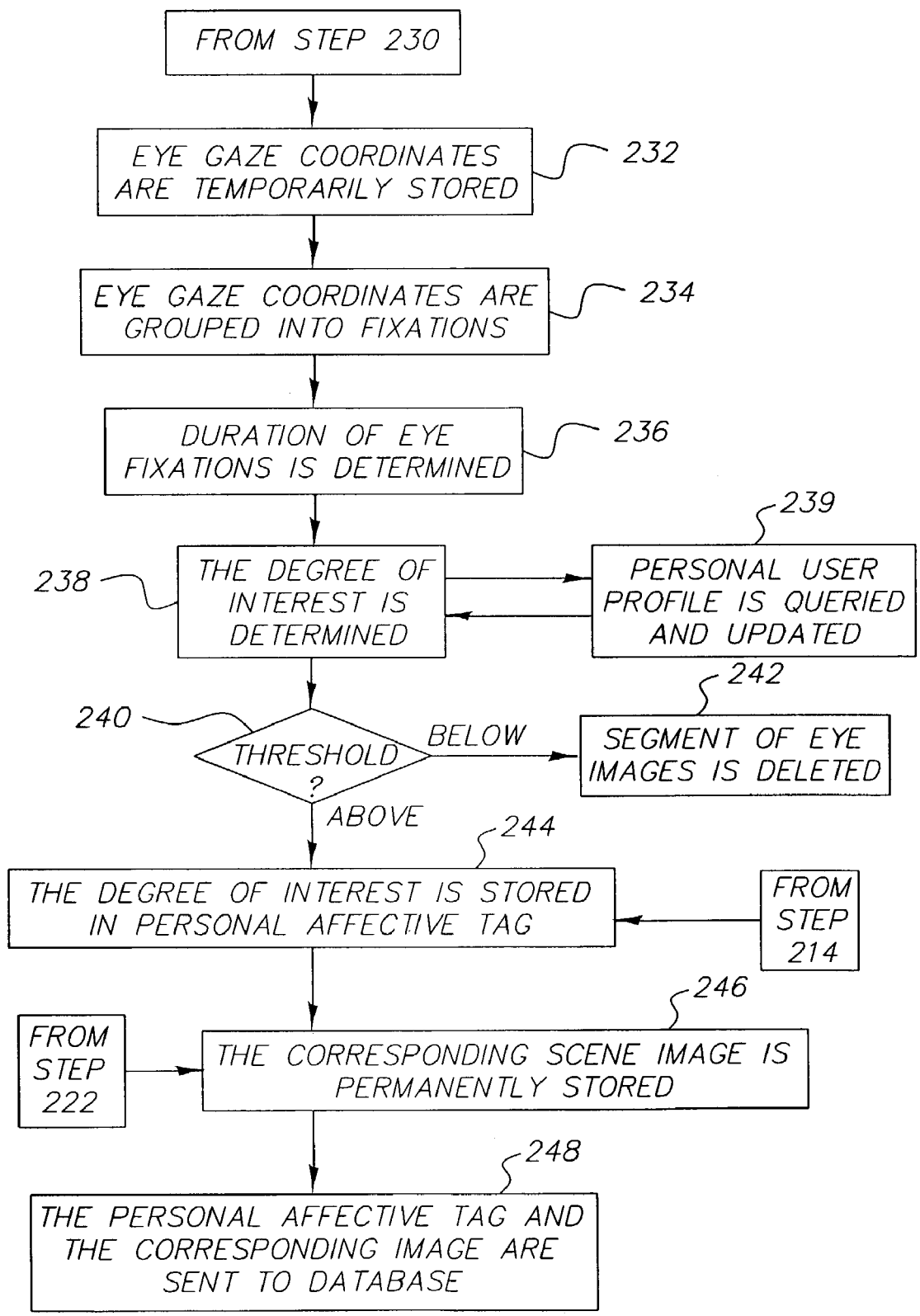

In previously discussed embodiments affective information was extracted from facial characteristics of user 2. FIGS. 4*a* and 4*b* show a flow diagram illustrating another embodiment of the present invention where affective information is provided in terms of a degree of interest based upon a physiological characteristic namely eye gaze information. With this embodiment, a degree of interest is determined based on eye gaze fixation time, which is the time that eyes of user 2 are fixated at a particular location of the scene, before fixating at a different location.

The data described in a paper entitled "Looking at Pictures: Affective, Facial, Visceral, and Behavioral Reactions", published by Psychophysiology, Vol. 30, pp. 261–273, by Lang et al., 1993, indicates that on average, viewing time linearly correlates with the degree of the interest or attention an image elicit in an observer. Thus, such a relationship allows interpreting the fixation time as the user's degree of interest toward an area of a scene. The quoted publication by Lang et al. compares a viewing time with the degree of the interest for third party images of scenes only. In the present invention, fixation time information is assessed directly for scenes as well as first party images of the scenes and stored as a personal affective tag as part of the image metadata or in a separate file in association with the user identifier and the image identifier.

In the embodiment of FIGS. 4*a* and 4*b*, method steps 210–228 generally correspond to method steps 110–128 in FIG. 2 with only one difference: in step 218, the user selects the "fixation time" signal. Alternatively, the image capture device 6 can be preprogrammed to capture the "fixation time" information.

In this embodiment, user video camera 10 in image capture device 6 captures a sample of eye images during a time window, such as a time window of 30 seconds, when the user views the scene (step 230) during one of image composition, capture, and immediate post capture review. In some embodiments, the time window can be modified by user 2.

Coordinates of the eye gaze direction of user 2 are stored with a sampling rate, such as a sampling rate of 60 Hz (step 232). In some embodiments, the sampling rate can be modified by user 2. The sampling rate can also be modified based upon other factors such as the rate of charge from the eye gaze as the time rate of change of scene contents or the amount of memory available for storing affective data.

The raw gaze coordinates are grouped into eye fixations (step 234). An eye fixation is usually defined as period of at least 50 msec during which the gaze coordinates do not change by more than 1-degree of visual angle. For each fixation, a start time, end time and gaze coordinates are determined. Additionally, an average pupil diameter can be determined for each fixation. The duration of eye fixations is measured based on their start and end times (step 236).

Image capture device 6 determines the degree of interest for each eye fixation (step 238). The absolute degree of interest is defined as the corresponding fixation time. The relative degree of interest is defined as the fixation time divided by the average fixation time for the particular user. The average fixation time can be constantly updated and stored on digital storage device 12 as a part of a personal user profile for user 2. The personal user profile is queried and updated with respect to the average fixation time for user 2 (step 239).

The obtained degree of interest is compared to a threshold value established for the user (step 240). If the obtained degree of interest is above the threshold value, then the image capture device 6 creates a personal affective tag indicating the degree of interest (step 244). Alternatively, the threshold value for the degree of interest could also be established automatically from the personal user profile, for example, on the basis of the prior cumulative probability for the user's degree of interest distribution of user 2. One such probability could be equal 0.5, and thus, the threshold value for the degree of interest would correspond to the value that occurs in at least 50% of the cases.

In one embodiment, image capture device 6 stores the corresponding image and the degree of interest in the personal affective tag as part of the image metadata (step 246). Alternatively, the degree of interest can be stored in a separate file in association with the user identification data and the image identifier. Where this is done, data is stored in the image metadata indicating the location of the file having the personal affective information. In addition, the information about the date the user views a certain image can be also recorded as a separate entry into personal affective tag.

In another embodiment the scene images and the raw eye images are stored. The raw eye images can be analyzed later, either by the CPU 14 or by a processor in a separate device (not shown), which receives the stored images.

The corresponding image, the personal affective tag and other image metadata are sent to a personal database of digital images, as described earlier in relation to step 148 (step 248).

If the obtained degree of interest is below the threshold value the corresponding eye images are deleted (step 242). If the obtained degree of interest is below the threshold value and user 2 is still viewing the same scene or a captured image of the same scene such as for example on preview screen 22, image capture device 6 can optionally capture another segment of eye images and repeat steps 232 through 240 as user 2 views the same scene or the captured image of the same scene.

If the threshold value is set to 0, all scene images and corresponding affective information (degree of interest or, in another embodiment, raw eye images) recorded by the image capture device 6 will be stored as affective information either in a separate file on the image capture device 6 together with the image identifier and the user identifier, or in the personal affective tag as part of the image metadata.

The image capture device 6 continues recording images f the scene 4 using capture module 8 and facial images of user 2 using user video camera 10, as long as user 2 keeps the image capture device 6 powered on. In step 168, if the power is turned off, the image capture device 6 stops recording the images of the scene and the facial images and also ends the process of affective tagging.

If the user keeps the power turned on, the process of capturing the next image of the scene (steps 220–226) and simultaneously determining and storing a personal affective tag for the captured image (steps 230–246) are repeated.

As mentioned earlier, the degree of interest can be used in a digital imaging system to rank images in a systematic and continuous manner as favorite or high value images for a specified user as described in commonly assigned U.S. patent application Ser. No. 10/036,113, filed Dec. 26, 2001, entitled "Method for Creating and Using Affective Information in a Digital Imaging System" by Matraszek et al. U.S. patent application Ser. No. 10/036,123, filed Dec. 26, 2001, entitled "Method for Using Affective Information Recorded With Digital Images for Producing an Album Page" by Matraszek et al.

In alternative embodiments, user camera 10 and central processing unit 14 can be used to obtain additional information from images of user's eye(s). Examples of such information include but are not limited to eye ball acceleration, tear formation, eye temperature, iris patterns, blood vessel patterns and blood vessel size. This information can be used to determine user's identity, emotional state and/or health condition. This information can be stored as part of an affective tag.

Figure 5A:
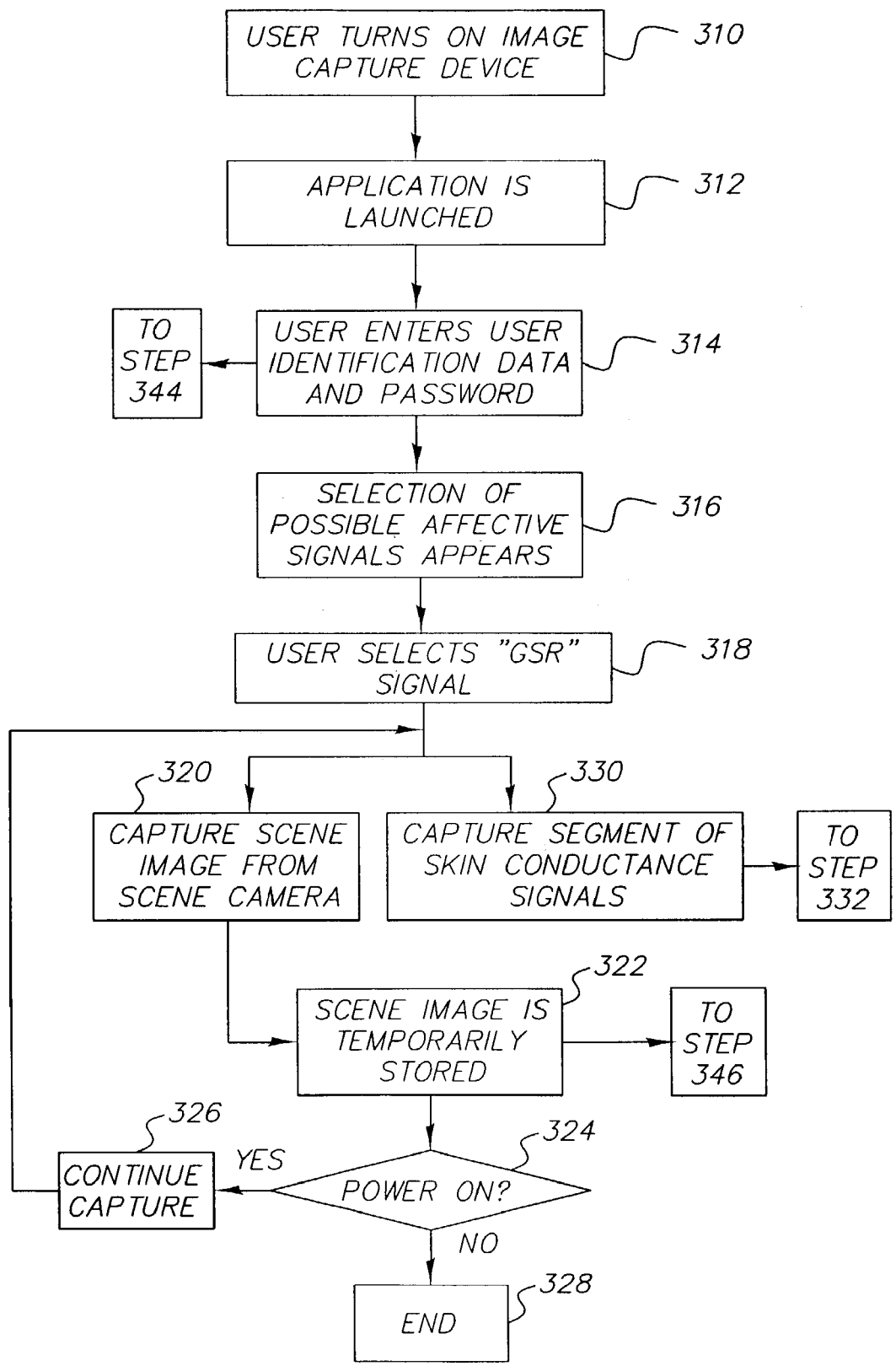
FIGS. 5a and 5b comprise a flow diagram showing a method where affective information is provided based on analysis of skin conductance.
Figure 5B:
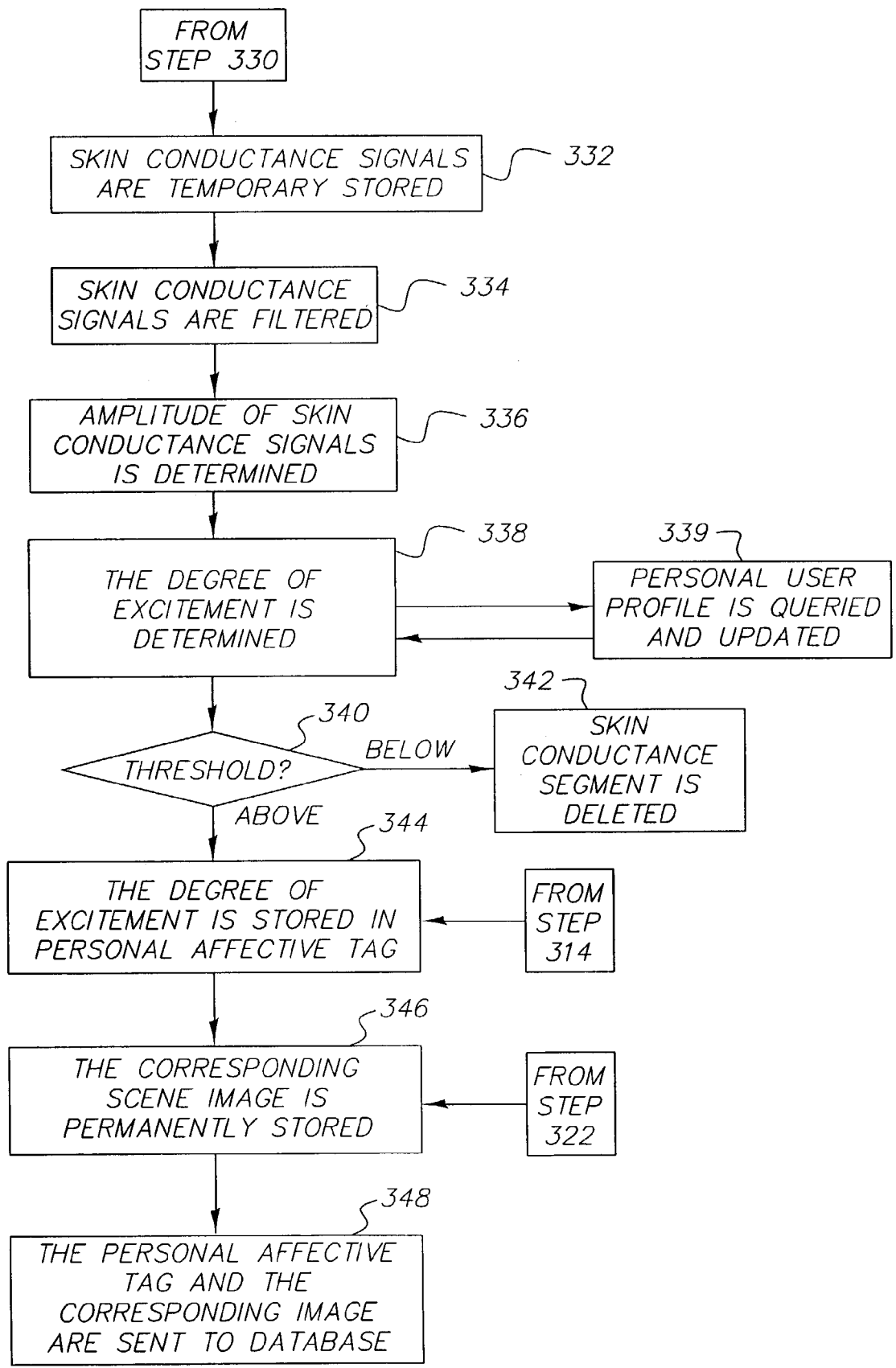

Another source of affective information originates from physiological signals generated by user 2. FIG. 5 illustrates an embodiment of the present invention where affective information is determined from a physiological signal. In this embodiment, the physiological signal is skin conductance and the affective information derived from the skin conductance is expressed in terms of a degree of excitement.

Skin conductance change is a measure of galvanic skin response. Skin conductance reflects a change in a magnitude of the electrical conductance of the skin that is measured as a response to a certain event—viewing the scene or images of the scene. As described in the paper entitled "Looking at Pictures: Affective, Facial, Visceral, and Behavioral Reactions", published in *Psychophysiology*, Vol. 30, pp. 261–273, 1993, by Lang et al., skin conductance changes depends on the arousal the image elicits in the viewer: the higher the conductance, the lower the arousal or excitement, and vice versa: the lower the conductance, the higher the arousal. The measure of the amplitude of the skin conductance response is also used to determine interest or attention.

In this embodiment, method steps 310–328 generally correspond to steps 110 through 128 in FIG. 2 with only one difference: in step 318, user 2 can manually instruct image capture device 6 to capture galvanic skin response information as at least a part of the affective information. Alternatively image capture device 6 can be preprogrammed to capture galvanic skin response information. The image capture device 6 measures the galvanic skin response signal during a time window, for example a time window of 5 seconds, using the galvanic skin response sensor 16 (step 330). In some embodiments, the time windows can be modified by user 2. One example of galvanic skin response sensor 16 can be, for example, SC-Flex/Pro sensor from ProComp detector system sold by Thought Technology, Ltd. W. Chazy, N.Y. USA.

The galvanic skin response skin conductance signals are stored using a sampling rate, for example a sampling rate of 60 Hz (step 332). In some embodiments, the sampling rate can be modified by user 2. The sampling rate can also be modified based upon other factors such as the rate of change of scene contents, the time rate of change of galvanic skin response, or the amount of memory available for storing affective data. The galvanic skin response conductance signals are filtered to reduce the noise in the data (step 334). The amplitude of the galvanic skin response skin conductance signals is then determined (step 336).

Image capture device 6 determines the degree of excitement based upon galvanic skin response signals (step 338). The absolute degree of excitement for the scene is equivalent to the amplitude of the filtered galvanic skin response skin conductance signal. The relative degree of excitement is defined as the amplitude of the galvanic skin response signal divided by the average galvanic skin response signal for the particular user. The average skin conductance can be constantly updated and stored on digital storage device 12 as a part of the user's psychophysiological profile. To compute the relative degree of excitement, the average skin conductance response information is retrieved from a personal user profile. The personal user profile is updated regarding the skin conductance response information (step 339).

The obtained degree of excitement is compared to a threshold value established for the user (step 340). If the obtained degree of excitement is above the threshold value, the image capture device 6 creates a personal affective tag indicating the degree of excitement (step 344). In another embodiment, the threshold value for the degree of excitement can be established automatically from the personal user profile, for example, on the basis of the prior probabilities for the user's degrees of excitement. One such probability could be equal 0.5, and thus, the threshold value for the degree of excitement would correspond to the value that occurs in at least 50% of the cases. Alternatively, the personal affective tag can include a value selected from a range of excitement values enabling the differentiate of the relative degree of excitement between various captured images.

Image capture device 6 stores the corresponding scene image and the degree of excitement in the personal affective tag as part of the image metadata (steps 344 and 346). Alternatively, the degree of excitement can be stored in a separate file in association with the user identification data and the image identifier. In addition, the information about the date the user views a certain image also can be recorded as a separate entry into personal affective tag.

In another embodiment the raw galvanic skin response signal is stored as affective information either in a separate file on the image capture device 6 together with the image identifier and the user identification data, or in the personal affective tag as part of the image metadata.

The corresponding image, the personal affective tag and other image metadata are sent to a personal database of digital images, as was described earlier in relation to step 148 (step 348).

In step 342, if the obtained degree of excitement is below the threshold value the corresponding skin conductance signals are deleted. If the obtained degree of excitement is below the threshold value and user 2 is still viewing the same scene or a captured image of the scene for example on a preview screen 22, image capture device 6 can optionally measure the next segment of skin conductance signals for 5 seconds and repeat steps 332 through 340 as user 2 views the same scene or a captured image of the same scene.

If the threshold value is set to 0, all scene images and corresponding affective information recorded by the image capture device 6 will be stored. The personal user profile can then be updated (step 339).

As mentioned earlier, the degree of excitement can be used in a digital imaging system to rank images in a systematic and continuous manner as favorite, important or exciting images for a specified user as described in commonly assigned U.S. patent application Ser. No. 10/036,113, filed Dec. 26, 2001, entitled "Method for Creating and Using Affective Information in a Digital Imaging System" by Matraszek et al.; Ser. No. 10/036,123, filed Dec. 26, 2001, entitled "Method for Using Affective Information Recorded With Digital Images for Producing an Album Page" by Matraszek et al.

It is understood that each user 2 might have different physiological and facial responses to an image. Some users might exhibit strong physiological responses while exhibiting only modest facial responses. Other users might exhibit modest physiological responses while exhibiting strong facial responses. Still other users might exhibit modest physiological and facial responses. Accordingly, by combining different types of affective information, a more robust representation of the emotional response of user 2 to the scene can be obtained. The following embodiments show methods for interpreting affective information using physiological and facial response information in combination to help facilitate interpretation of affective information.

Figure 6A:
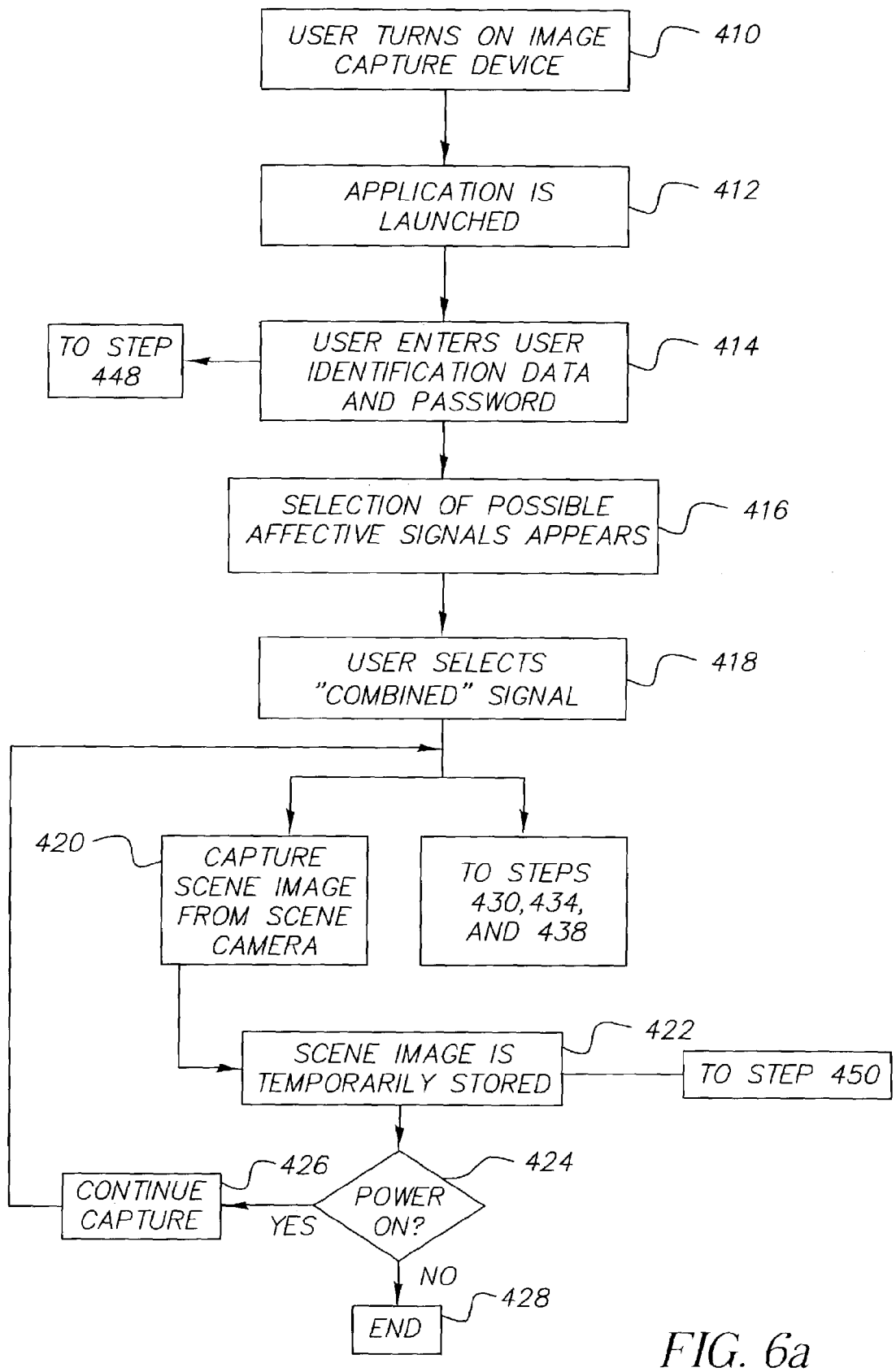
FIGS. 6a and 6b comprise a flow diagram showing an embodiment of a method where affective information is provided based on combined analysis of facial characteristics and physiological characteristics.
Figure 6B:
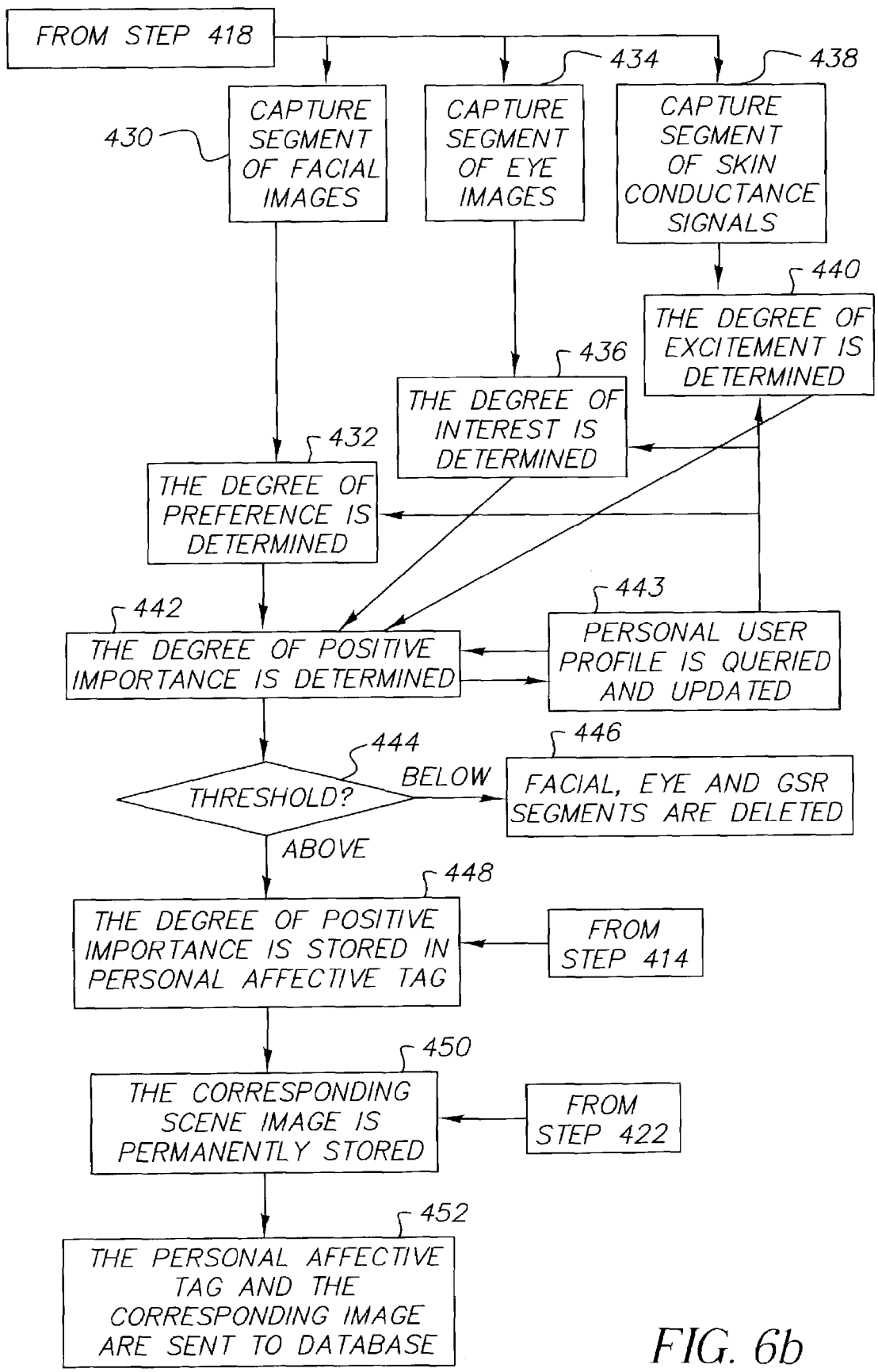

Referring to FIGS. 6a and 6b, there is shown a flow diagram illustrating another embodiment of the present invention for providing affective information based on the combination of the three affective signals described in relation to FIGS. 2–4, namely, the degree of preference, the degree of interest, and the degree of excitement, which are further combined to obtain an integral measure of positive importance.

In this embodiment, method steps 410–428 correspond to method steps 110–128 in FIG. 2 with only one difference: in step 418, the user selects the use of "combined" signals or alternatively, the image capture device 6 is preprogrammed to use the "combined" signals.

The image capture device 6 determines the degree of preference (DP) based on facial expression as was described earlier in relation to steps 130 through 139 in FIG. 2. (steps 430 and 432) The image capture device 6 also determines the degree of interest (DI) based on fixation time the same way as in steps 230 through 239 in FIG. 3. (steps 434 and 436) The image capture device 6 further determines the degree of excitement (DE) based on skin conductance the same way as in steps 330 through 339 in FIG. 5 (steps 438 and 440).

The image capture device 6 determines the degree of positive importance (or "favoriteness") based on a sum of the three measures:

$$\text{Positive Importance} = DP + DI + DE$$

In another embodiment, the degree of positive importance is determined based on a weighted sum of these three measures, $$\text{Positive Importance} = w_{DP}DP + w_{DI}DI + w_{DE}DE$$

where the weights $w_{DP}$, $w_{DI}$, and $w_{DE}$ are determined based on the standard deviation within each of the normalized (divided by the maximum value) signals previously obtained for the particular user. In this case, the higher the standard deviation within the signal, the higher the weight of the contribution for the signal into the measure of positive importance. Consequently, the lower the standard deviation of a given signal, the lower the weight of the contribution for the corresponding signal into the measure of positive importance. The reason for this dependency stems from the assumption that a standard deviation of a particular measure for a particular user reflects an individual degree of differentiation between different scenes. This implies that the signal with the highest standard deviation has more differentiation power, and therefore is more important to consider while determining an integral measure of positive importance for a particular user.

For example, if different scenes evoke a large variations of facial expression and a low variation of skin conductance responses for a user A, than the weight given to the measure of degree of preference (DP) based on facial expression $w_{DP}$ would be higher than the weight given to the measure of the degree of excitement (DE) based on skin conductance $w_{DE}$. On the other hand, if different scenes evoke smaller variations of facial expression and a large variation of skin conductance responses for a user B, than the relationships between the weights is reversed. Data about the maximum values and the standard deviation of the corresponding signals can be obtained from the personal user profile in step 443. The personal user profile is then updated regarding this information.

The obtained degree of positive importance is compared to a threshold value (step 444). This threshold can be predetermined. The threshold can also be established by user 2 or established for user 2. If the obtained degree of positive importance is above the threshold value, then the image capture device 6 creates a personal affective tag indicating the degree of positive importance (step 448). In another embodiment the threshold value could be determined automatically from the personal user profile, for example, on the basis of the prior cumulative probabilities of the degree of positive importance distribution. One such threshold value then can be chosen as corresponding to the degree of positive importance with the prior probability of 0.5.

Image capture device 6 stores the corresponding scene image and the degree of positive importance in the personal affective tag as part of the image metadata (step 450). Alternatively, the degree of positive importance can be stored in a separate file in association with the user identification data and the image identifier. In addition, the information about the date the user views a certain image can be also recorded as a separate entry into personal affective tag.

The corresponding image, the personal affective tag and other image metadata are sent to a personal database of digital images, as described earlier in reference to step 148 of FIG. 2 (step 452).

If the obtained degree of positive importance is below the threshold value the corresponding segment of facial images, eye images and skin conductance signals are deleted (step 446).

If the obtained degree of positive importance is below the threshold value and user 2 is still viewing the same scene or a captured image of the scene for example on preview screen 22, image capture device 6 can optionally measure the next segment of facial images, eye images and skin conductance signals and repeat steps 432 through 444 as user 2 is views the same scene or the captured image of the same scene.

If the threshold value is set to 0, all scene images and corresponding affective information (degree of positive importance or, in another embodiment, raw facial images, eye images and galvanic skin response signals) recorded by the image capture device 6 will be stored.

As mentioned earlier, the degree of positive importance can be used in a digital imaging system to rank images in a systematic and continuous manner as favorite, important or exciting images for a specified user as described in commonly assigned U.S. patent application Ser. No. 10/036,113, filed Dec. 26, 2001, entitled "Method for Creating and Using Affective Information in a Digital Imaging System" by Matraszek et al.; and Ser. No. 10/036,123, filed Dec. 26, 2001, entitled "Method for Using Affective Information Recorded With Digital Images for Producing an Album Page" by Matraszek et al.

In another embodiment, different combinations of facial expressions, eye characteristics and physiological reactions can be used to create the personal affective tag to classify scenes in accordance with a broader range of emotional categories, such as 'joy', 'fear', 'anger', etc. An example of such classification is shown in Table 1.

TABLE 1

Emotion classification based on combinations of facial expressions, eye characteristics and physiological reactions

| | Signals | | |
|---|---|---|---|
| Emotion | Facial expressions | Eye characteristics | Physiological reactions |
| Joy | smile, crinkled skin around eyes corners | Opened eyelids, dilated pupils, direct gaze | accelerated heart rate, large GSR |
| Fear | pale skin, trembling lips, chattering teeth | Widely opened eyelids, fast eye-blink rate, fixed gaze, dilated pupils, | accelerated heart rate, accelerated breathing rate, tightened muscle tension, sweaty palms |
| Anger | lowered brows, flared nostrils, horizontal wrinkles over nose bridge, tense-mouth | Narrowed eyelids, fixed gaze, | deep and rapid breathing, increased blood pressure |
| Surprise | raised eyebrows, opened mouth, wrinkled brow and forehead | Opened eyelids, Fixed gaze | large GSR |
| Disgust | wrinkled nose, raised nostrils, retracted upper lip, visible tongue, lowered brows | Narrowed eyelids, Averted gaze | decreased breathing rate |
| Sadness | lowered lips, cheeks, and jaw | Narrowed eyelids, tearing eyes, down gaze | flaccid muscles, decreased breathing rate |

Images can be further classified using a range of values for these categories, such as strongly happy, somewhat happy, neutral and somewhat sad, and strongly sad, etc.

The determined affective information in terms of the emotional category is then stored as personal affective tag, which includes the user identifier as part of the image metadata. It can also be stored in a separate file on the computer together with the image identifier and the user identifier.

Figure 7A:
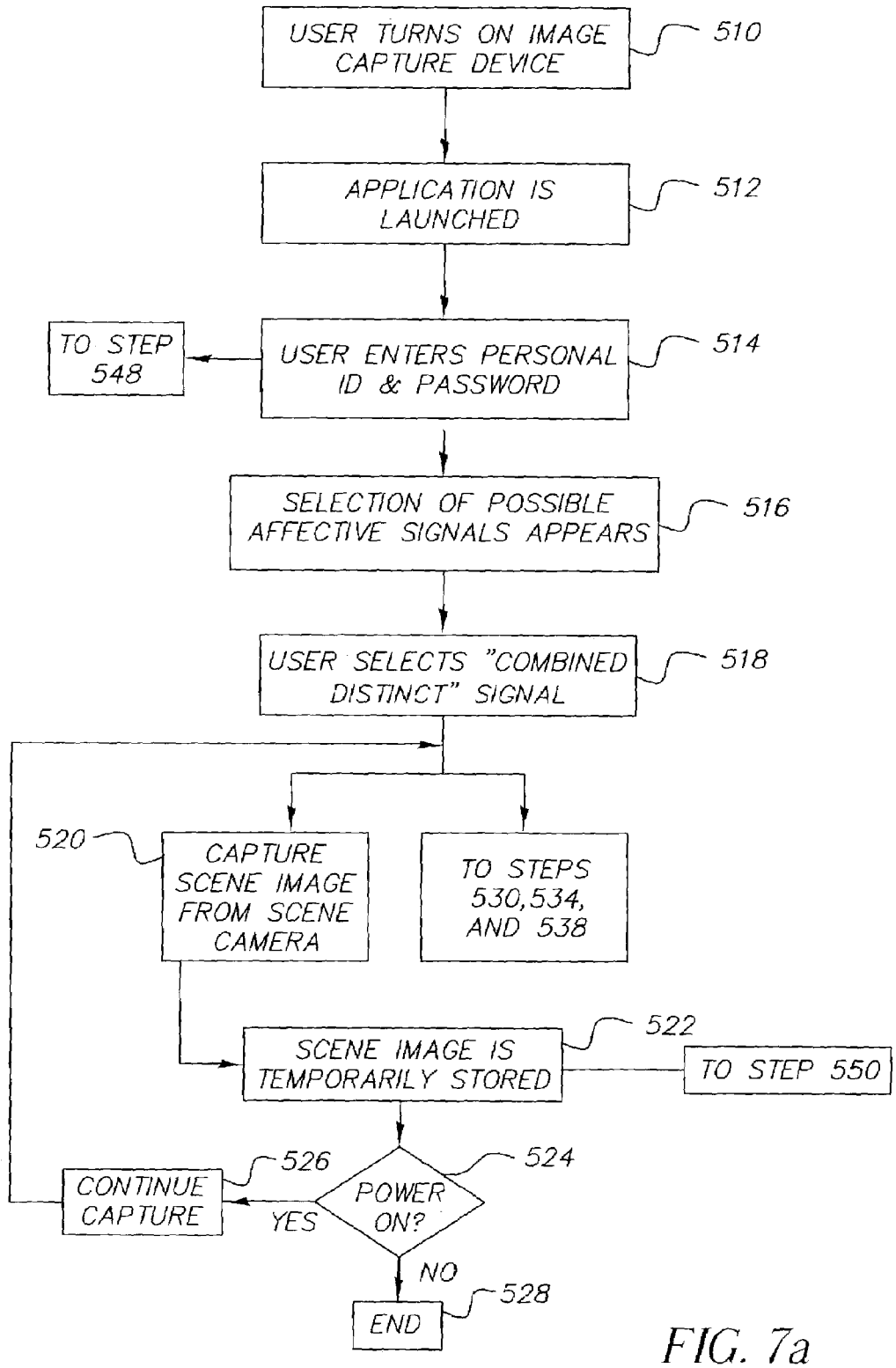
FIGS. 7a and 7b comprise a flow diagram showing another embodiment of a method for providing affective information based on combined analysis of facial characteristics and physiological characteristics.
Figure 7B:
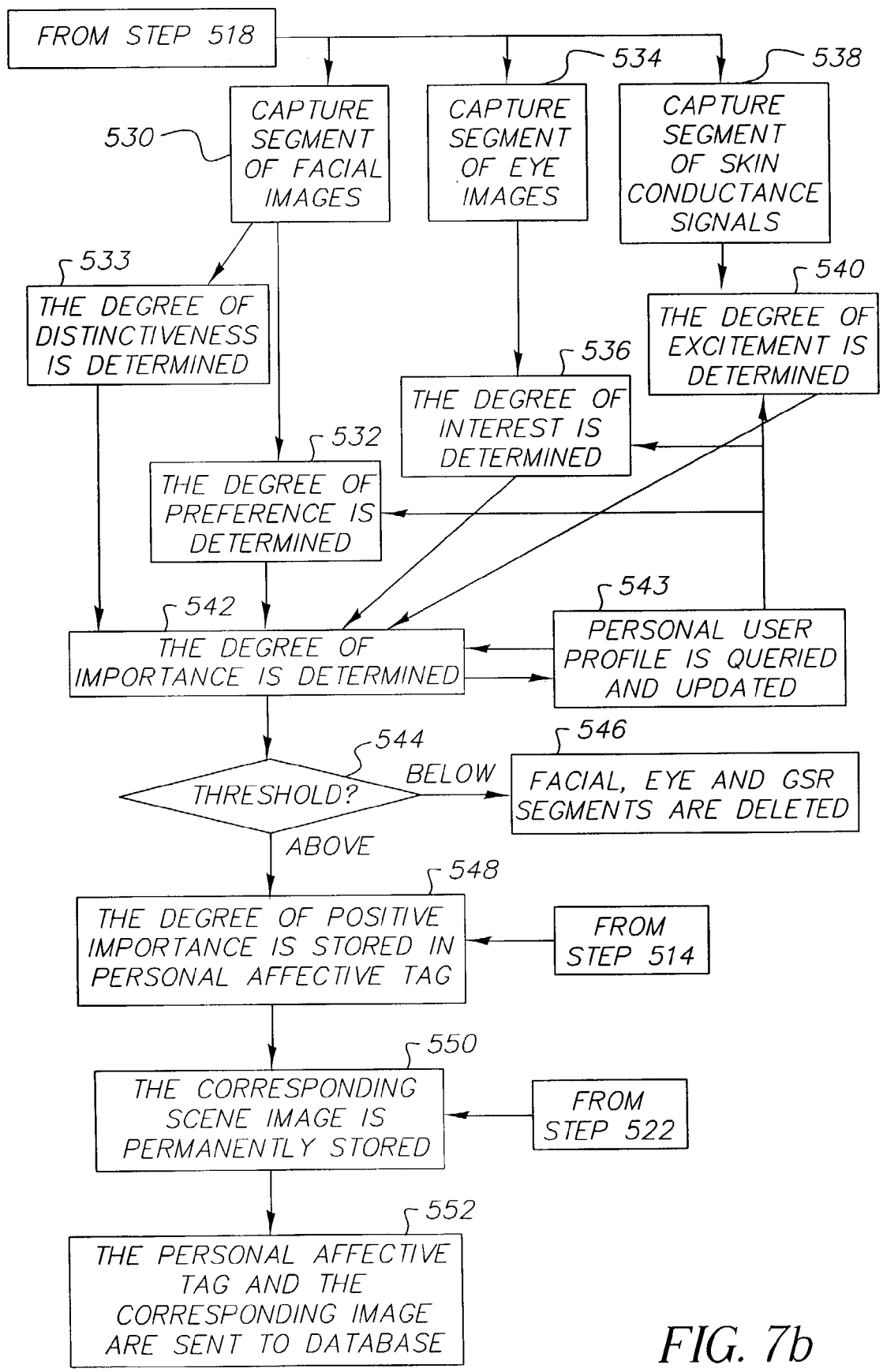

Referring to FIG. 7, there is shown a flow diagram illustrating another embodiment of the present invention wherein physiological and facial analyses are used in combination to determine affective information. In this embodiment, affective information about a user's response to an image is based on the combination of the four affective signals described in relation to FIGS. 2–5, namely, the degree of preference, the degree of distinctiveness, the degree of interest, and the degree of excitement, which are further combined to obtain an integral measure of importance. This embodiment is suited for an embodiment such as a wearable image capture device 6 shown in FIG. 1c.

In this embodiment, method steps 510–528 correspond to method steps 410 through 428 in FIG. 6 with only two differences: the user selects the use of "combined distinct" signals or, alternatively, the image capture device 6 is preprogrammed to use the "combined distinct" signals.

Image capture device 6 determines the degree of distinctiveness (DD) as described earlier in relation to steps 170–179 in FIG. 3 (steps 530 and 533).

The image capture device 6 determines the degree of importance (or magnitude of emotional response). In this embodiment, the measure of the degree of importance is based on a sum of the four measures:

Importance=DP+DD+DI+DE

Importance=$DPw_{DP}+DDw_{DD}+DIw_{DI}+w_{DE}DE$ where the weights $w_{DP}$, $w_{DD}$, $w_{DI}$, and $w_{DE}$ are determined based on the standard deviation within each of the normalized (divided by the maximum value) signals previously obtained for the particular user. In this case, the higher the standard deviation within the signal, the higher the weight of the contribution for the signal into the measure of importance. Consequently, the lower the standard deviation of a given signal, the lower the weight of the contribution for the corresponding signal into the measure of importance. The reason for this dependency stems from the assumption that a standard deviation of a particular measure for a particular user reflects an individual degree of differentiation between different scenes. This implies that the signal with the highest standard deviation has more differentiation power, and therefore is more important to consider while determining an integral measure of importance for a particular user.

For example, if different scenes evoke a large variations of facial expression and a low variation of skin conductance responses for a user A, than the weight given to the measure of degree of preference (DP) based on facial expression $w_{DP}$ would be higher than the weight given to the measure of the degree of excitement (DE) based on skin conductance $w_{DE}$. On the other hand, if different scenes evoke a smaller variation of facial expression and a large variation of skin conductance responses for a user B, than the relationships between the weights is reversed. Data about the maximum values and the standard deviation of the corresponding signals can be obtained from the personal user profile in. The personal user profile is then updated regarding this information (step 543).

The obtained degree of importance is compared to a threshold value (step 544). This threshold can be predetermined. This threshold also can be established by user 2 or established for user 2. If the obtained degree of importance is above the threshold value, the image capture device 6 creates a personal affective tag indicating the degree of importance (step 548). In another embodiment the threshold value could be determined automatically from the personal user profile, for example, on the basis of the prior cumulative probabilities of the degree of importance distribution. One such threshold value then can be chosen as corresponding to the degree of importance with the prior probability of 0.5.

The image capture device 6 stores the corresponding scene image and the degree of importance in the personal affective tag as part of the image metadata (step 550). Alternatively, the degree of importance can be stored in a separate file in association with the user identifier and the image identifier. In addition, the information about the user 2 views a certain image can be also recorded as a separate entry into personal affective tag.

The corresponding image, the personal affective tag and other image metadata are sent to a personal database of digital images, as described earlier in reference to step 152 of FIG. 2. (step 552).

If the obtained degree of importance is below the threshold value the corresponding segment of facial images, eye images and skin conductance signals are deleted (step 540). In another embodiment, if the obtained degree of importance is below the threshold value and user 2 is still viewing the same scene or a captured image of the scene for example on preview screen 22, image capture device 6 can optionally measure the next segment of facial images, eye images and skin conductance signals and repeat steps 532 through 544 as user 2 views the same scene or the captured image of the scene.

If the threshold value is set to 0, all scene images and corresponding affective information (degree of importance or, in another embodiment, raw facial images, eye images and galvanic skin response signals) recorded by the image capture device 6 will be stored.

In other embodiments, different combinations of these three or other affective signals (such as derived from voice, EEG, brain scan, eye movements and others) can be used to create the personal affective tag to classify scenes in accordance with broader range of emotional categories. Further, non-affective information such as location information, image analysis, calendaring and scheduling information, time and date information can be used to help better determine affective information such as a degree of importance for association with an image.

As mentioned earlier, the degree of importance can be used in a digital imaging system to rank images in a systematic and continuous manner as favorite, important or exciting images for a specified user as described in commonly assigned U.S. patent application Ser. No. 10/036,113, filed Dec. 26, 2001, entitled "Method for Creating and Using Affective Information in a Digital Imaging System" by Matraszek et al.; Ser. No. 10/036,123, filed Dec. 26, 2001, entitled "Method for Using Affective Information Recorded With Digital Images for Producing an Album Page" by Matraszek et al. The degree of importance can also be used in an image capture device 6 to make decisions about image compression, resolution and storage. A computer program for creating and using personal affective tags in an image capture device can be recorded on one or more storage medium, for example; magnetic storage media such as magnetic disk (such as a floppy disk) or magnetic tape;

optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The personal affective tag can also include information designating a relative degree of importance. As described earlier, the relative degree of importance can be determined on the basis of affective information only. Alternatively, affective and non-affective information can be used in combination to determine the relative degree of importance. Examples of non-affective information include date and time information, location information such as would be available from a Global Positioning System or a similar type of electronic locator. Image analysis of the image itself can also be used as a source of non-affective information that can influence the relative degree of importance. For example, the presence of particular subject matter in a scene can be readily identified by existing image processing and image understanding algorithms. One such algorithm is disclosed in commonly assigned U.S. Pat. No. 6,282,317 B1 entitled, filed Dec. 31, 1998 by Luo et al., the disclosure of which is incorporated herein by reference, describes a method for automatic determination of main subjects in photographic images by identifying flesh, face, sky, grass, etc. as the semantic saliency features together with the "structural" saliency features related to color, texture, brightness, etc., and then combining those features to generate belief maps.

Another image processing technique disclosed in commonly-assigned US Pat. Pub. No. US2002/0076100A1 entitled "Image Processing Method for Detecting Human Figures in a Digital Image" filed on Dec. 14, 2000, by Luo et al., the disclosure of which is incorporated herein by reference, allows detecting human figures in a digital color image. The algorithm first performs a segmentation of the image into non-overlapping regions of homogeneous color or texture, with subsequent detection of candidate regions of human skin color and candidate regions of human faces; and then for each candidate face region, constructs a human figure by grouping regions in the vicinity of the face region according to a pre-defined graphical model of the human figure, giving priority to human skin color regions. The presence of people in a scene or particular people, established using facial recognition algorithms such as described in an article entitled "Face Recognition Using Kernel Based Fisher Discriminant Analysis", published in the Proceedings of the Fifth IEEE International Conference on Automatic Face and Gesture Recognition, pp. 0197–0201, 2002 by Liu, et al. may be used to increase the relative degree of importance. It can also be used to selectively process the image in order to enhance its quality, emphasize a main subject as described in commonly assigned U.S. patent application Ser. No. 09/642,533, entitled "Digital Image Processing System and Method for Emphasis a Main Subject of an Image", filed on Aug. 18, 2000, by Luo et al. and to share this image with the people identified or to transmit the image to an agency because of security concerns.

In the embodiments described above, the images and image capture system have been described as being digital images and digital image capture systems. Consistent with the principles of the invention, images of the scene can be captured in an analog electronic form or on an optical medium such as a photographic film or plate. Where the image is captured in one of these forms, data representing affective information can be recorded in association with the image by recording affective information separately from the image with some identification code indicating the image with which the information is to be associated. Alternatively, affective information can be encoded and recorded in association with the analog electronic image. Where a photographic film or plate is used, the affective information can be recorded optically or magnetically on the film or plate. The affective information can also be recorded on an electronic memory associated with the film or plate.

In accordance with the present invention, affective information is described as being captured at the time of capture or during capture. As used herein, these terms encompass any time period wherein an image is being composed or captured. Such time periods can also include periods immediately after the moment of capture, when, for example, a photographer is verifying that a captured image meets her satisfaction.

The invention has been described in detail with particular reference to certain preferred embodiments thereof, but it will be understood that variations and modifications can be effected within the spirit and scope of the invention.

PARTS LIST 2 user
4 scene
6 image capture device
8 capture module
10 user video camera
12 digital storage device
13 manual controls
14 central processing unit
15 sensors
16 galvanic skin response sensors
17 vascular sensor
18 communication module
19 vibration sensor
20 Internet service provider
22 preview screen
24 viewfinder
26 bridge
28 glasses frame
29 side piece
110 activate image capture device step
112 launch application step
114 enter user identification data step
116 determine emotional reaction step
118 select desirable signal step
120 capture scene image step
122 store scene image step
124 detect power on step
126 continue capture step
128 deactivate power step
130 capture facial image step
132 store facial image step
134 analyze facial image step
136 determine smile size step
138 determine degree of preference step
139 update personal user profile step
140 compare to threshold step
142 delete facial image step
144 create personal affective tag step
146 store image and affective tag step
148 send image and affective tag step
150 activate image capture device step
152 launch application step
154 enter user identification step
155 determine emotional reaction step 158 select desirable signal step
160 capture scene image step
162 store scene image step
164 detect power on step
166 continue capture step
168 deactivate power step
170 capture facial image step
172 store facial image step
174 analyze facial expression step
176 determine emotional category step
178 determine degree of distinctiveness step
179 update personal user profile step
180 compare degree of distinctiveness to threshold
182 delete image step
184 create personal affective tag step
186 store image step
188 send image and affective information
210 activate image capture device step
212 launch application step
214 enter personal information step
216 determine emotional reaction step
218 select eye gaze information step
220 capture scene image step
222 store scenic image step
224 detect power on step
226 continue capture step
228 deactivate power step
230 capture sample of eye gaze image step
232 store eye gaze coordinates step
234 determine fixation step
236 measure duration of fixation step
238 determine degree of interest in fixation step
239 update personal user profile step
240 compare to threshold step
242 delete image step
244 create personal affective tag step
246 store image and affective tag step
248 send image and affective tag step
310 activate image capture device step
312 launch application step
314 enter personal information step
316 determine emotional reaction step
318 select eye gaze information step
320 capture scene image step
322 store scene image step
324 detect power on step
326 continue capture step
328 deactivate power step
330 capture first segment of galvanic skin response step
332 store skin conductance step
334 filter galvanic skin response signal step
336 determine amplitude of galvanic skin response step
338 determine degree of excitement step
339 update personal user profile step
340 compare to threshold step
342 capture next segment step
344 store degree of excitement step
346 store image and affective tag step
348 send image and affective tag step
410 activate image capture device step
412 launch application step
414 enter personal information step
416 determine emotional reaction step
418 select desirable signal step
420 capture scene image step
422 store scene image step
424 detect power on step
426 continue capture step
428 end
430 capture facial images step
432 determine degree of preference step
434 capture eye segment step
436 determine degree of interest step
438 capture segment of skin conductance signals step
440 determine degree of excitement step
442 determine degree of importance step
443 query and update personal user profile step
444 compare importance to threshold value step
446 delete image step
448 create affective tag step
450 store images and affective tag step
452 send data step
510 activate image capture device step
512 launch application step
514 enter personal information step
516 determine emotional reaction step
518 select desirable signal
520 capture scene image step
522 store scene image step
524 end
526 continue capture step
528 deactivate power step
530 capture facial image step
532 determine degree of preference step
533 determine degree of distinctiveness step
534 capture eye segment step
536 determine degree if interest step
538 capture segment of skin conductance signals step
540 determine degree of excitement step
542 determine degree of importance step
543 query and update personal user profile step
544 compare importance to threshold value step
546 delete facial eye and galvanic skin step
548 create affective tag step
550 store images and affective tag step
552 send image step

What is claimed is:

1. An imaging method comprising the steps of:
capturing an image of a scene;
collecting affective information at capture; and
associating the affective information with the scene image, wherein the step of collecting affective information comprises monitoring the physiology of a user and, wherein the step of collecting affective information comprises the steps of interpreting the collected physiological information to determine the relative degree of importance of the scene image.

2. The method of claim 1, further comprising the steps of:
collecting user identification data; and
associating the affective information and the user identification data with the scene image.

3. The method of claim 1, further comprising the steps of:
collecting user identification information;
identifying a user based on the user identification data; and
associating the affective information and the scene image with the user.

4. The method of claim 1, wherein the step of associating the affective information with the image comprises storing the scene image, the affective information and user identification data in a common digital file.

5. The method of claim 1, wherein the step of associating the affective information with the image comprises storing the affective information within the scene image.

6. The method of claim 1, wherein the affective information and user identifier are stored in association with the scene image.

7. The method of claim 1, further comprising the step of using the collected affective information and user identification data to build a personal user profile.

8. The method of claim 7, further comprising the step of: identifying a user based on the user identification data.

9. The method of claim 1, wherein the step of collecting affective information at capture comprises collecting an image of a user from which affective information can be obtained.

10. The method of claim 9, wherein an electronic image of at least a part of a face of the user is captured and affective information is derived therefrom.

11. The method of claim 1, wherein the step of collecting affective information at capture comprises determining a relative degree of importance.

12. The method of claim 11, wherein the step of associating the affective information with the image comprises storing the relative degree of importance in association with the scene image.

13. The method of claim 1, wherein the relative degree of importance of the image is established at least in part based upon the personal user profile.

14. The method of claim 1, wherein the step of automatically collecting affective information includes monitoring the eye gaze of the user.

15. The method of claim 1, further comprising the step of obtaining non-affective information at capture.

16. The method of claim 15, further comprising the step of interpreting the affective information and non-affective information to determine the relative degree of importance of the scene image.

17. The method of claim 16, wherein the non-affective information includes the captured image and the relative degree of importance is at least in part determined by analysis of the scene image.

18. The method of claim 1, wherein the step of collecting affective information comprises collecting manually entered affective information.

19. The method of claim 1, wherein the step of collecting affective information at capture comprises detecting composition of an image, and collecting affective information during composition.

20. The method of claim 1, wherein the step of collecting affective information at capture comprises detecting verification of a scene image and collecting affective information during verification.

21. An imaging method comprising the steps of:

capturing a stream of images;

collecting a stream of affective information during image capture; and associating the stream of affective information with the stream of images, wherein the stream of affective information comprises is examined to determine when relevant changes in affective information occur and the step of associating the affective information with the corresponding stream of images comprises associating data representing relevant changes in the affective information with the stream of images at a points in the stream of images that correspond to the occurrence of the relevant changes.

22. The method of claim 21, wherein the stream of affective information includes user identification data.

* * * * *